United States Patent
Numakami

(10) Patent No.: US 10,158,418 B2
(45) Date of Patent: Dec. 18, 2018

(54) RELAY APPARATUS, COMMUNICATION APPARATUS, CONTROL METHODS THEREOF, SYSTEM, AND NON-TRANSITORY COMPUTER-READABLE STORAGE MEDIUM

(71) Applicant: CANON KABUSHIKI KAISHA, Tokyo (JP)

(72) Inventor: Yukio Numakami, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 106 days.

(21) Appl. No.: 14/645,573

(22) Filed: Mar. 12, 2015

(65) Prior Publication Data
US 2015/0271739 A1    Sep. 24, 2015

(30) Foreign Application Priority Data

Mar. 20, 2014 (JP) ................. 2014-059079

(51) Int. Cl.
*H04W 48/02* (2009.01)
*H04W 28/02* (2009.01)
(Continued)

(52) U.S. Cl.
CPC ..... *H04B 7/15528* (2013.01); *H04B 7/15542* (2013.01); *H04W 12/06* (2013.01);
(Continued)

(58) Field of Classification Search
CPC ......... H04L 63/08; H04L 63/10; G06F 21/30; H04W 4/008; H04W 12/08; H04W 12/06
See application file for complete search history.

(56) References Cited

U.S. PATENT DOCUMENTS 9,075,971 B2    7/2015    Towata
9,097,541 B2    8/2015    Bando et al.
(Continued)

FOREIGN PATENT DOCUMENTS

JP    2001-051946 A    2/2001
JP    2010-050750 A    3/2010
(Continued)

OTHER PUBLICATIONS

Japanese Office Action dated Feb. 9, 2018, in related Japanese Patent Application No. 2014-059079.

*Primary Examiner* — Joseph P Hirl
*Assistant Examiner* — Thomas A Gyorfi
(74) *Attorney, Agent, or Firm* — Fitzpatrick, Cella, Harper & Scinto

(57) ABSTRACT

A relay apparatus, capable of relaying communication between a communication apparatus and a server, communicates with the communication apparatus and the server through first wireless communication, and carries out control for determining whether or not to permit the communication apparatus to communicate with the server through the first wireless communication in response to a request received from the communication apparatus, that is based on a predetermined protocol. The relay apparatus sends the request to the server and receives data written in a predetermined format as a response to the request, and carries out the control based on the data.

14 Claims, 22 Drawing Sheets

(51) Int. Cl.
*H04W 12/06* (2009.01)
*H04B 7/155* (2006.01)
*H04W 12/08* (2009.01)
*H04W 4/80* (2018.01)
*H04W 4/00* (2018.01)

(52) U.S. Cl.
CPC ............ *H04W 12/08* (2013.01); *H04W 4/008* (2013.01); *H04W 4/80* (2018.02)

(56) References Cited

U.S. PATENT DOCUMENTS

| | | | |
|---|---|---|---|
| 9,313,202 B2 | 4/2016 | Sato | |
| 9,451,527 B2 | 9/2016 | Shinomiya | |
| 9,479,488 B2* | 10/2016 | Tseng | ................... H04L 63/08 |
| 9,571,494 B2 | 2/2017 | Mogaki | |
| 9,760,708 B2 | 9/2017 | Shimakawa | |
| 2002/0141586 A1* | 10/2002 | Margalit | ................ H04L 63/06 380/270 |
| 2009/0064346 A1* | 3/2009 | Larsson | ............. H04L 63/0807 726/29 |
| 2009/0233715 A1* | 9/2009 | Ergen | ..................... G08C 17/02 463/41 |
| 2011/0154459 A1* | 6/2011 | Kuang | ................... H04L 63/08 726/6 |
| 2011/0275316 A1* | 11/2011 | Suumaki | ............. G06K 7/10237 455/41.1 |
| 2012/0079582 A1* | 3/2012 | Brown | ................ H04L 63/0807 726/7 |
| 2012/0110646 A1* | 5/2012 | Ajitomi | ................. G06F 21/335 726/4 |
| 2013/0013673 A1* | 1/2013 | Ahmed | ............. G06F 17/30902 709/203 |
| 2013/0183932 A1* | 7/2013 | Lemilainen | ........... H04W 12/04 455/411 |
| 2013/0185769 A1* | 7/2013 | Jian | ..................... H04L 63/0492 726/4 |
| 2013/0326077 A1* | 12/2013 | Seo | ..................... H04L 65/1069 709/228 |
| 2013/0340065 A1* | 12/2013 | Dyer | ................... H04L 63/0281 726/12 |
| 2014/0020078 A1* | 1/2014 | Canning | ............ H04L 63/0815 726/8 |
| 2014/0223516 A1* | 8/2014 | Vongsouvanh | ..... H04L 63/0492 726/4 |
| 2014/0329497 A1* | 11/2014 | Sanzgiri | ................ H04W 12/06 455/411 |
| 2015/0081837 A1* | 3/2015 | Bernier | ................... H04W 8/24 709/217 |
| 2015/0089585 A1* | 3/2015 | Novack | ................... H04L 63/08 726/3 |
| 2015/0096001 A1* | 4/2015 | Morikuni | ................ H04L 63/08 726/7 |

FOREIGN PATENT DOCUMENTS

| | | |
|---|---|---|
| JP | 2011-039793 A | 2/2011 |
| JP | 2011-134032 A | 7/2011 |
| JP | 2012-032965 A | 2/2012 |
| JP | 2012-133696 A | 7/2012 |
| JP | 2013-088901 A | 5/2013 |
| JP | 2013-182436 A | 9/2013 |
| JP | 2013-246655 A | 12/2013 |
| JP | 2013-251873 A | 12/2013 |
| WO | 2013/145517 A1 | 10/2013 |

* cited by examiner

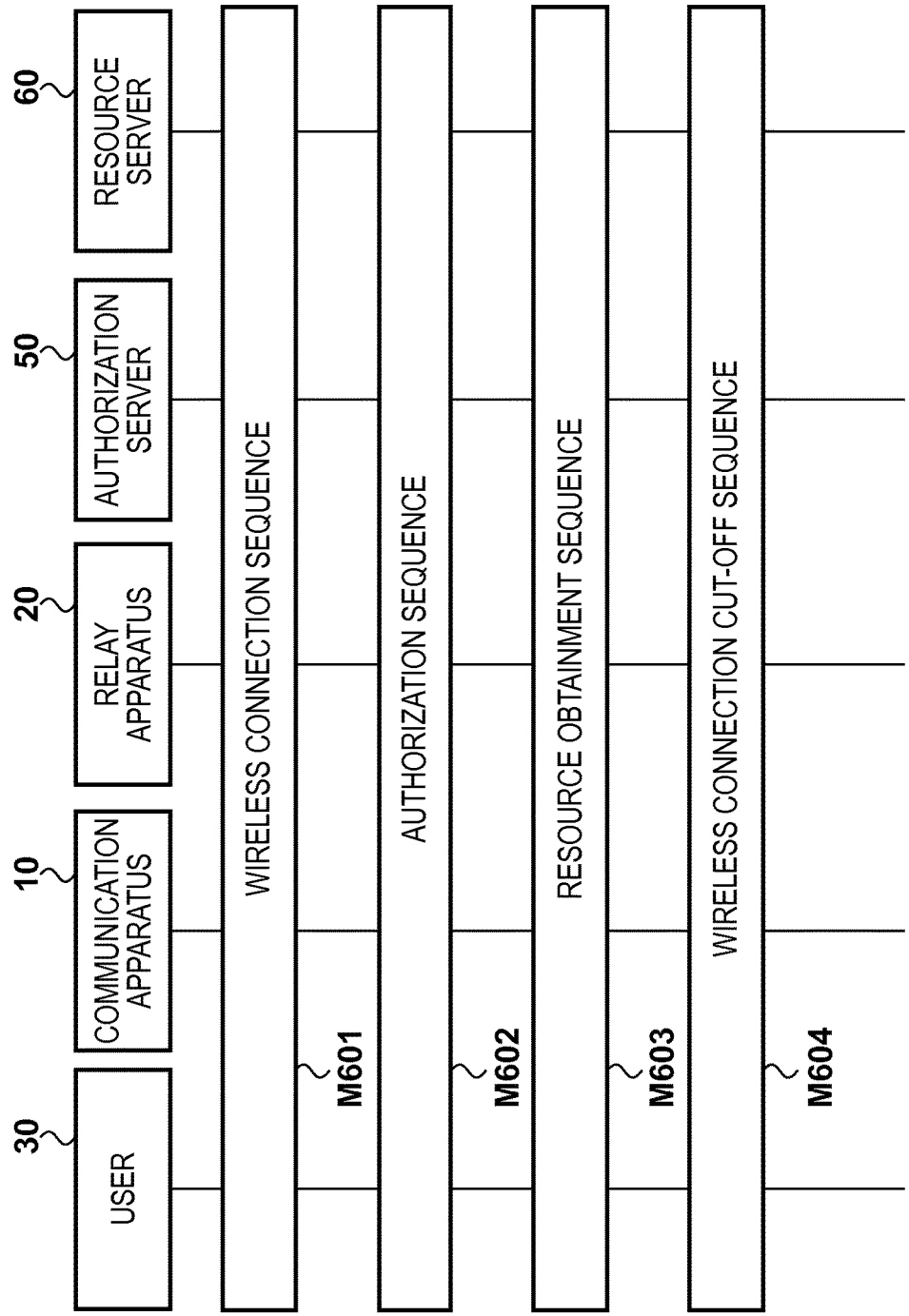

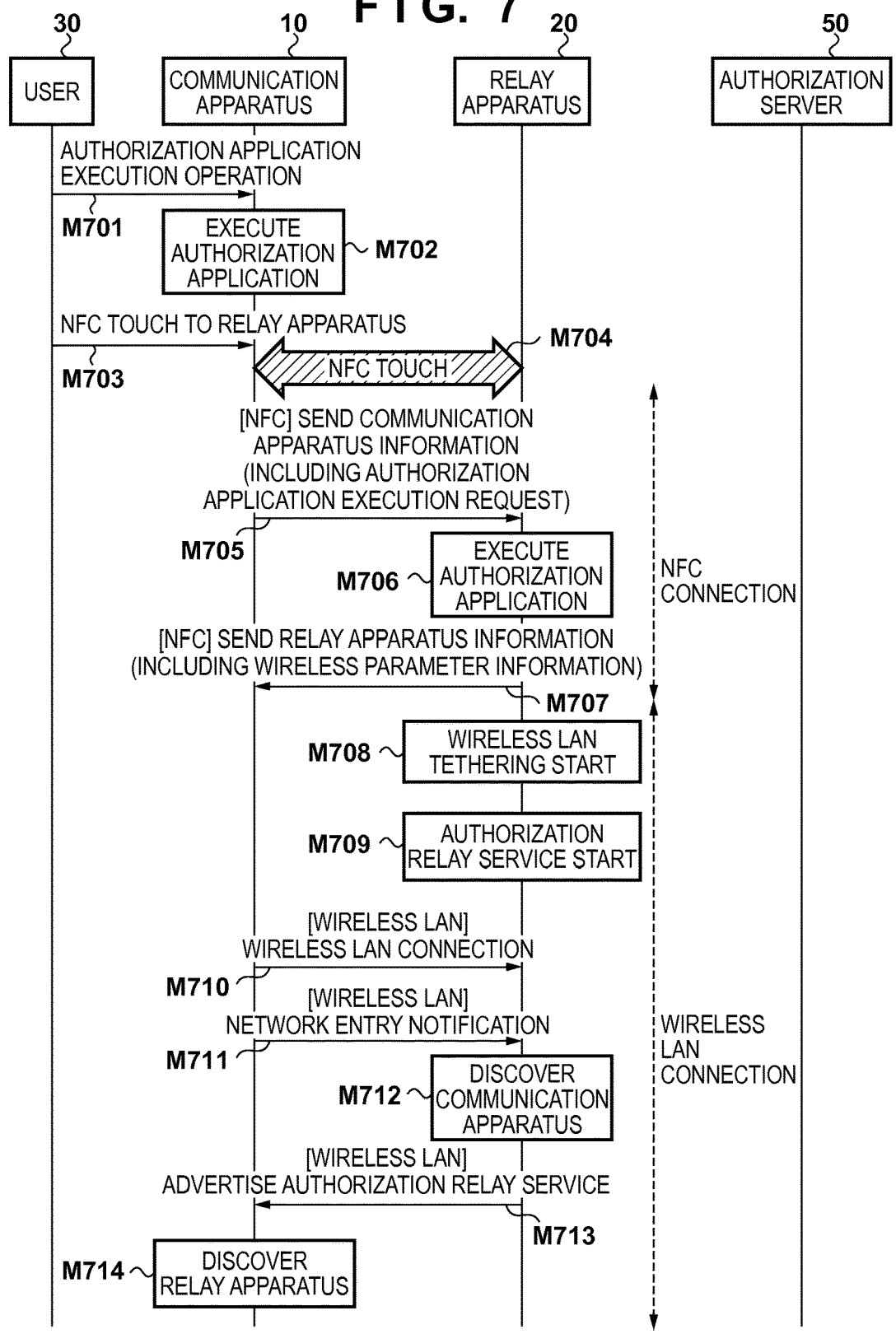

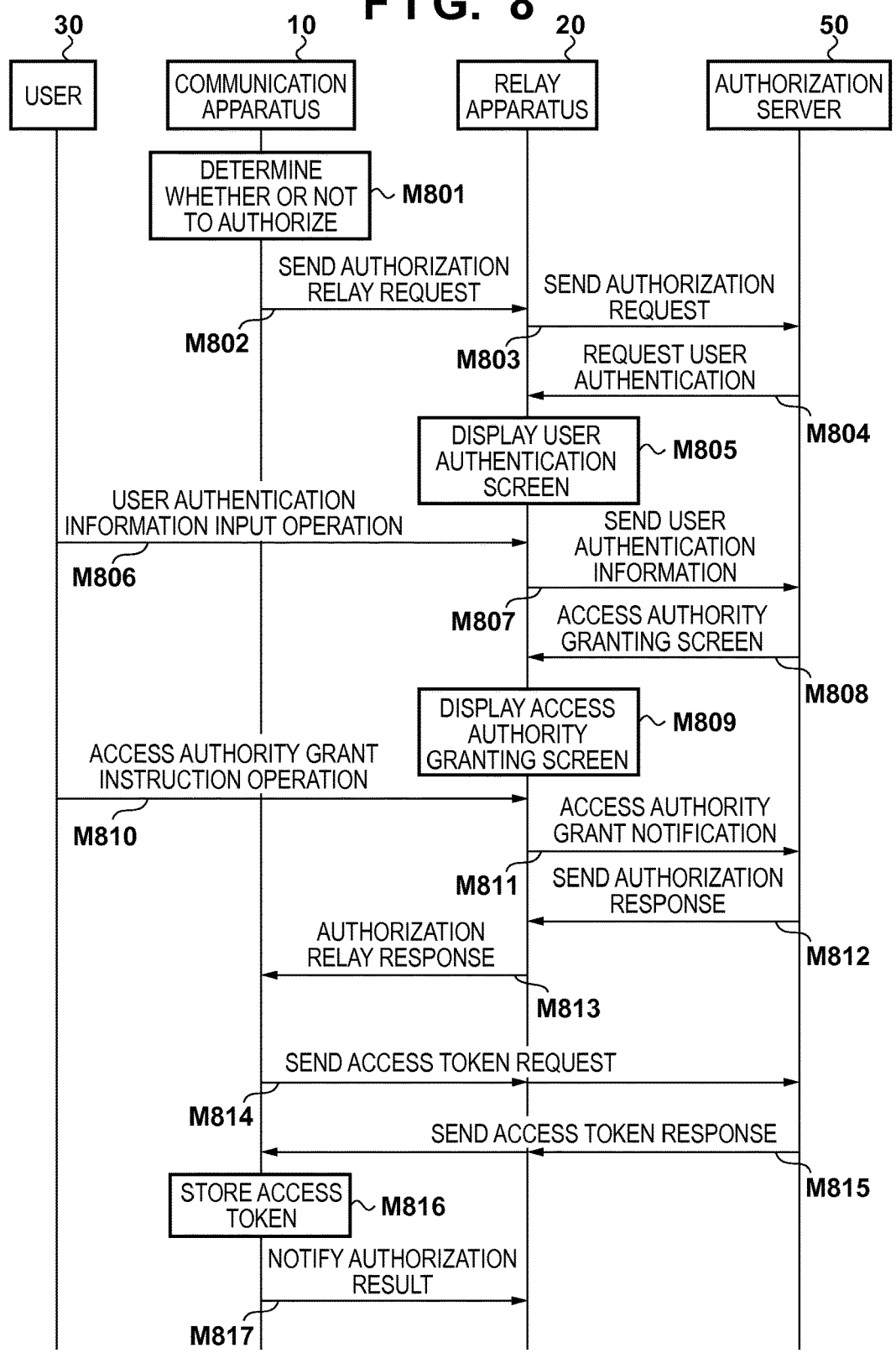

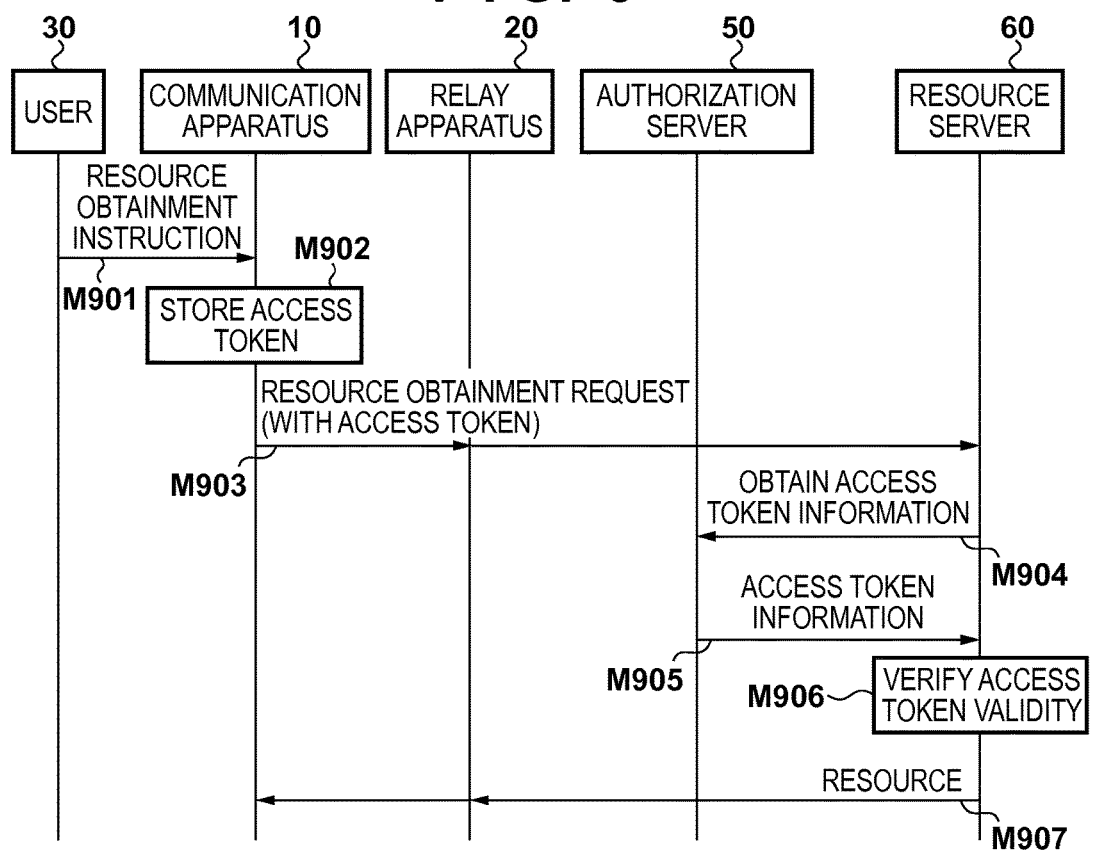
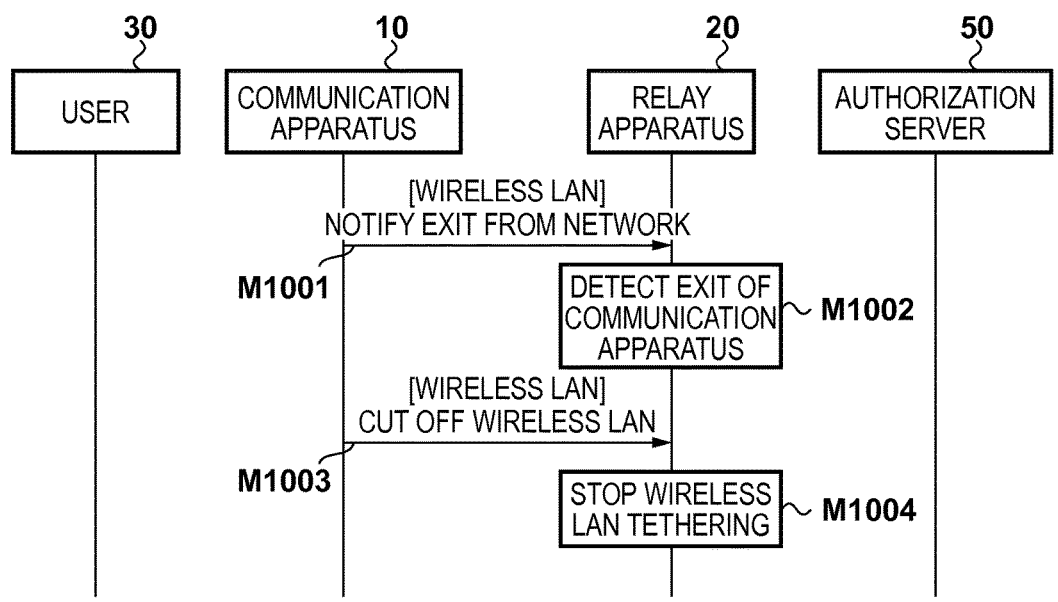

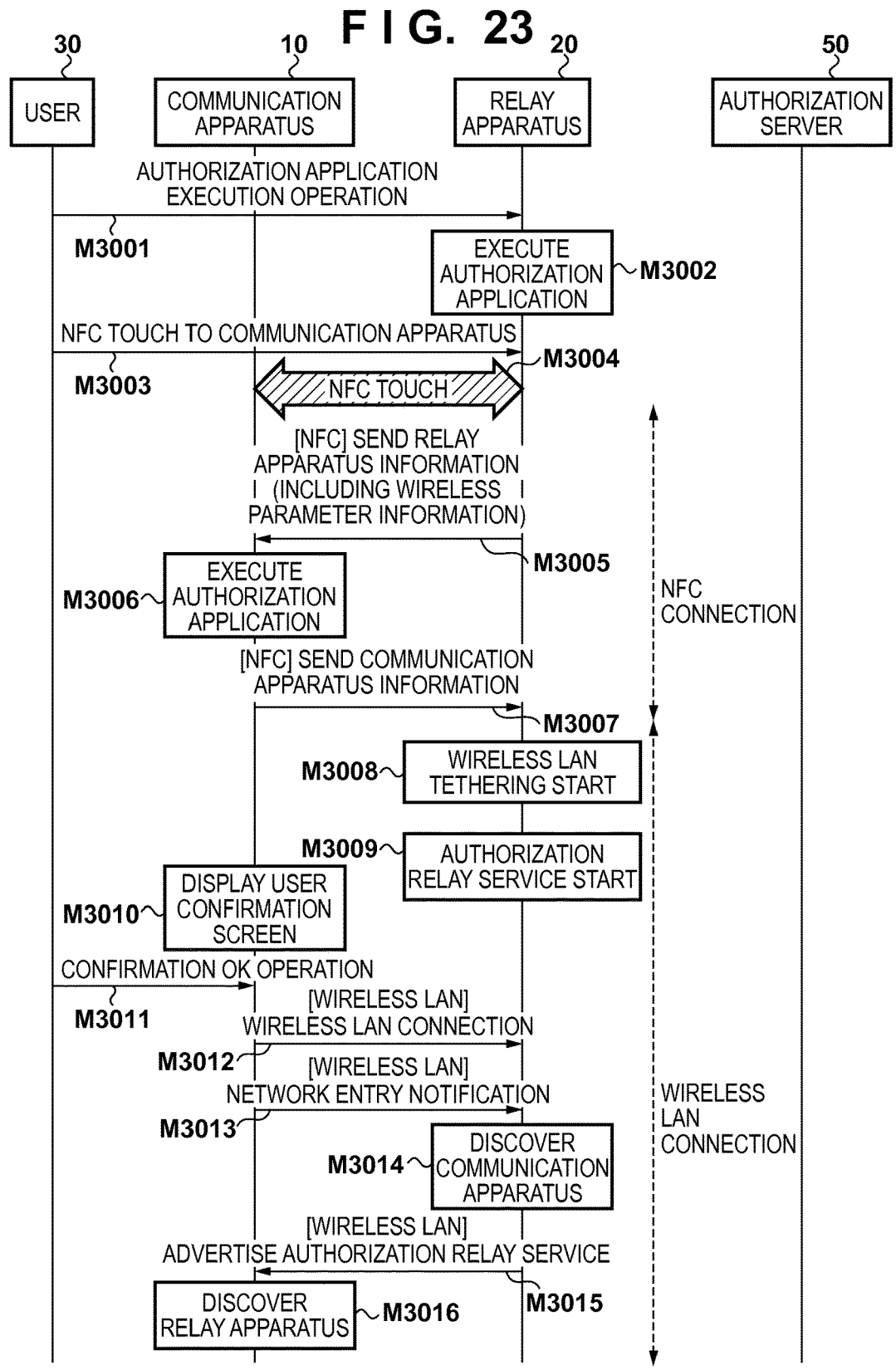

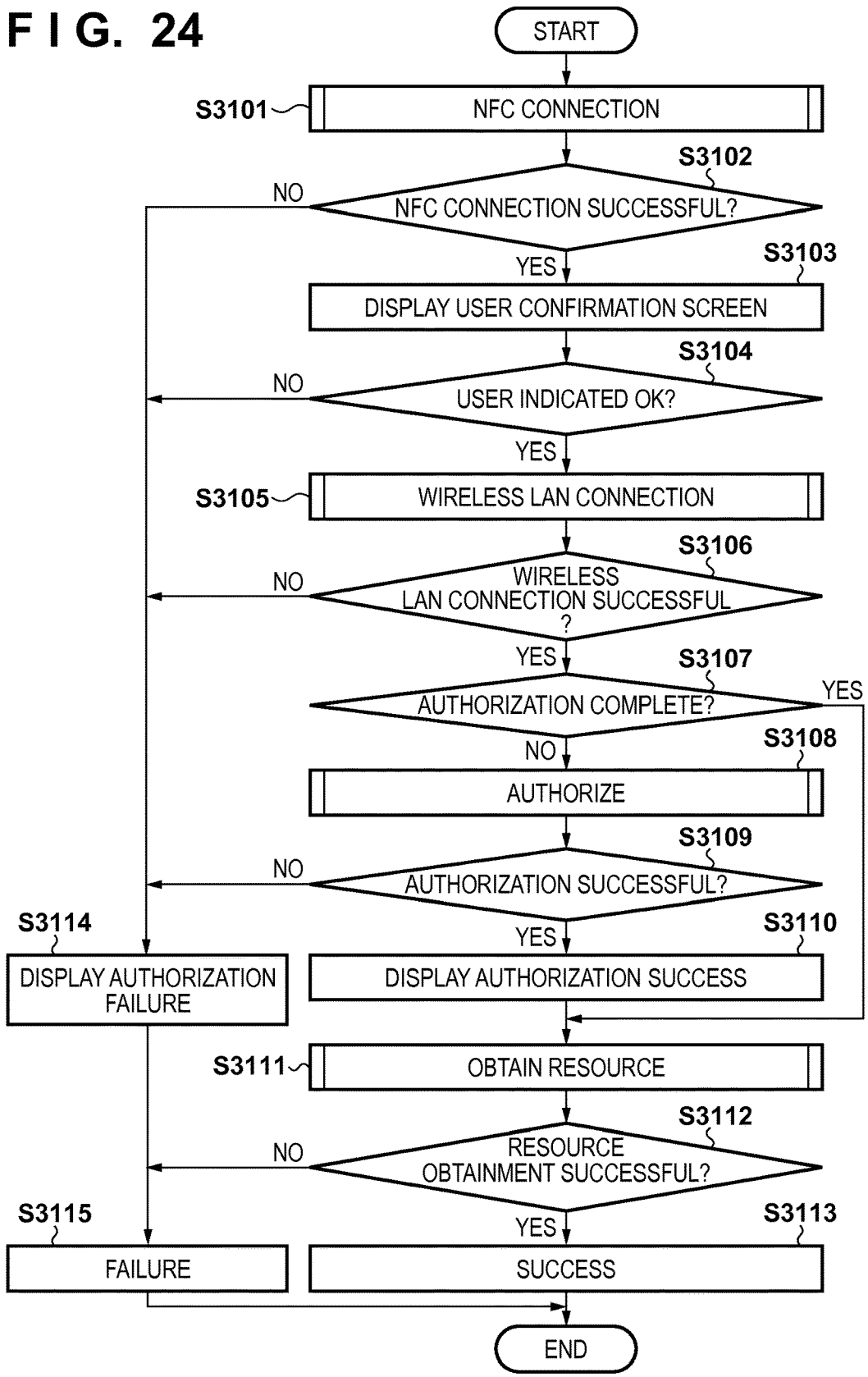

RELAY APPARATUS, COMMUNICATION APPARATUS, CONTROL METHODS THEREOF, SYSTEM, AND NON-TRANSITORY COMPUTER-READABLE STORAGE MEDIUM

BACKGROUND OF THE INVENTION

Field of the Invention

The present invention relates to techniques for using a relay apparatus to grant access authority to a communication apparatus with an authorization server.

Description of the Related Art

Recently, there are cellular phones, digital cameras, and the like that have functions for accessing resource servers for content sharing services, communication services, and the like on the Internet. A user can upload image content s/he captured to a photo sharing service, send messages to friends, or the like by using such communication apparatuses. Normally, a resource server for a photo sharing service or the like manages access authority for resources such as content, files, and the like on the resource server in tandem with an authorization server (Japanese Patent Laid-Open No. 2011-39793).

Authorization servers are increasingly using the OAuth protocol to manage (grant) access authority. According to OAuth, first, a communication apparatus obtains, from an authorization server, an access token indicating access authority for a desired resource and a refresh token for refreshing the access token. Then, when making a request to obtain the desired resource from a resource server, the communication apparatus issues the request along with the access token obtained from the authorization server. The resource server sends the requested resource to the communication apparatus only in the case where the access token is valid. In the case where the access token has expired, the communication apparatus can refresh the access token by providing the refresh token to the authorization server. Meanwhile, the user's authorization is required when delegating the user's access authority to the communication apparatus using the OAuth protocol. Normally, the authorization server presents an HTML window for the user to carry out an operation for granting the access authority, and the user carries out the operation for granting the access authority in a web browser.

However, according to the conventional technique, the HTML window provided by the authorization server cannot be displayed in the case where the communication apparatus does not include a web browser due to, for example, memory size limits or the like, and thus users have been unable to grant access authority using the OAuth protocol.

SUMMARY OF THE INVENTION

In light of the aforementioned problem, the present invention provides a technique for granting access authority using a relay apparatus.

According to one aspect of the present invention, there is provided a relay apparatus capable of relaying communication between a communication apparatus and a server which comprises: a communication unit configured to communicate with the communication apparatus and the server through first wireless communication; and a control unit configured to carry out control for determining whether or not to permit the communication apparatus to communicate with the server through the first wireless communication in response to a request, from the communication apparatus and received by the communication unit, that is based on a predetermined protocol, wherein the communication unit sends the request to the server and receives data written in a predetermined format as a response to the request, and the control unit carries out the control based on the data.

Further features of the present invention will become apparent from the following description of exemplary embodiments (with reference to the attached drawings).

BRIEF DESCRIPTION OF THE DRAWINGS

FIG. 6 is a sequence chart illustrating an overall example of messages according to the first embodiment.

FIG. 7 is a diagram illustrating an example of messages exchanged during a wireless connection between the communication apparatus 10 and the relay apparatus 20 according to the first embodiment.

FIG. 8 is a diagram illustrating an example of messages exchanged when carrying out authorization according to the first embodiment.

FIG. 9 is a diagram illustrating an example of messages exchanged when the communication apparatus 10 obtains a resource according to the first embodiment.

FIG. 10 is a diagram illustrating an example of messages exchanged when a wireless connection between the communication apparatus 10 and the relay apparatus 20 is cut off according to the first embodiment.

FIG. 23 is a sequence chart illustrating an example of messages exchanged during a wireless connection between the communication apparatus 10 and the relay apparatus 20 according to a second embodiment.

FIG. 24 is a flowchart illustrating an overall procedure performed by the communication apparatus 10 according to the second embodiment.

DESCRIPTION OF THE EMBODIMENTS

First Embodiment

Figure 1:
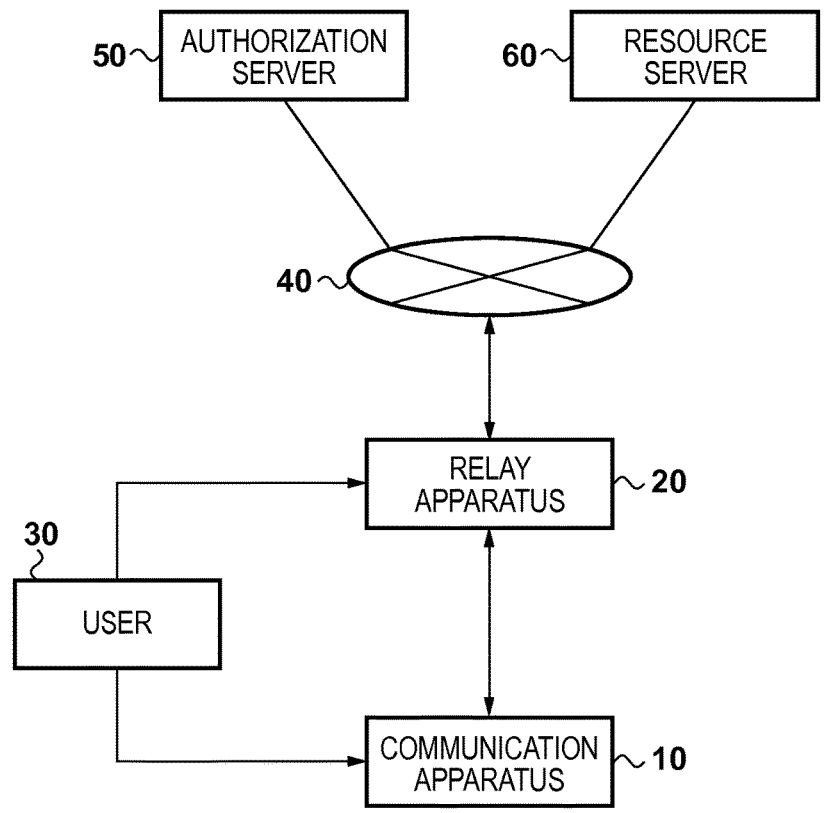
FIG. 1 is a diagram illustrating an example of the configuration of an authorization system according to a first embodiment.

The present embodiment describes a case in which a user 30 operates a communication apparatus 10 and starts an authorization process from the communication apparatus 10. FIG. 1 is a diagram illustrating an example of the configuration of an authorization system according to the present embodiment. The communication apparatus 10 corresponds to a communication apparatus according to the present embodiment, and includes a display function, an operation function, a wireless LAN (Local Area Network) communication function based on IEEE 802.11, and an NFC (Near Field Communication) communication function. However, in the present embodiment, it is assumed that the communication apparatus 10 does not include a web browser function. A digital camera, a digital video camera, a printer, a television, a video recorder, and so on can be given as specific examples of the communication apparatus 10.

The communication apparatus 10 uses the NFC communication function as first wireless communication. Although the NFC communication function is used in the present embodiment, the invention is not limited thereto, and another close-proximity wireless communication standard such as Bluetooth (registered trademark), ZigBee (registered trademark), RFID, or the like may be used instead. Meanwhile, the communication apparatus 10 uses the wireless LAN communication function as second wireless communication. Although the communication apparatus 10 uses the wireless LAN communication function in the present embodiment, the invention is not limited thereto, and another communication standard such as a wired LAN communication function, a WAN (Wide Area Network) communication function, or the like may be used instead. However, it is desirable for the first wireless communication to have a shorter communicable range and a slower transfer speed than the second wireless communication.

A relay apparatus 20 corresponds to a relay apparatus according to the present embodiment, and includes a display function, an operation function, a wireless LAN communication function, an NFC communication function, and a public wireless communication function such as 3G, LTE (Long Term Evolution), or the like. Furthermore, in the present embodiment, the relay apparatus 20 includes a web browser function. A cellular phone, a smartphone, a PC, or the like can be given as specific examples of the relay apparatus 20.

Although the relay apparatus 20 uses the wireless LAN communication function and the NFC communication function in the present embodiment in the same manner as the communication apparatus 10, the invention is not limited thereto, and another communication standard may be used instead. Likewise, although the relay apparatus 20 uses the public wireless communication function in the present embodiment, the invention is not limited thereto, and another communication standards such as the wireless LAN communication function, a wired LAN communication function, or the like may be used instead. In addition, in the present embodiment, the relay apparatus 20 includes a tethering function, and communicates with an authorization server 50 and a resource server 60 over public wireless communication by relaying the wireless LAN communication from the communication apparatus 10.

The user 30 corresponds to a user according to the present embodiment, and uses the communication apparatus 10 and the relay apparatus 20. A network 40 is a network that connects the relay apparatus 20, the authorization server 50, and the resource server 60. A wired LAN, a wireless LAN, a WAN, the Internet, and the like can be given as specific examples of the network 40.

The authorization server 50 corresponds to an authorization server according to the present embodiment, is compliant with OAuth 2.0, which is an OAuth protocol, and manages access authority for a resource on the resource server 60. Although the authorization server 50 uses OAuth 2.0 in the present embodiment, it should be noted that the invention is not limited thereto, and another authorization standard such as OAuth 1.0 and OpenID Connect, a proprietary authorization method, or the like may be used instead. The resource server 60 corresponds to a resource server according to the present embodiment, and manages resources held by the user of the communication apparatus 10.

Figure 2:
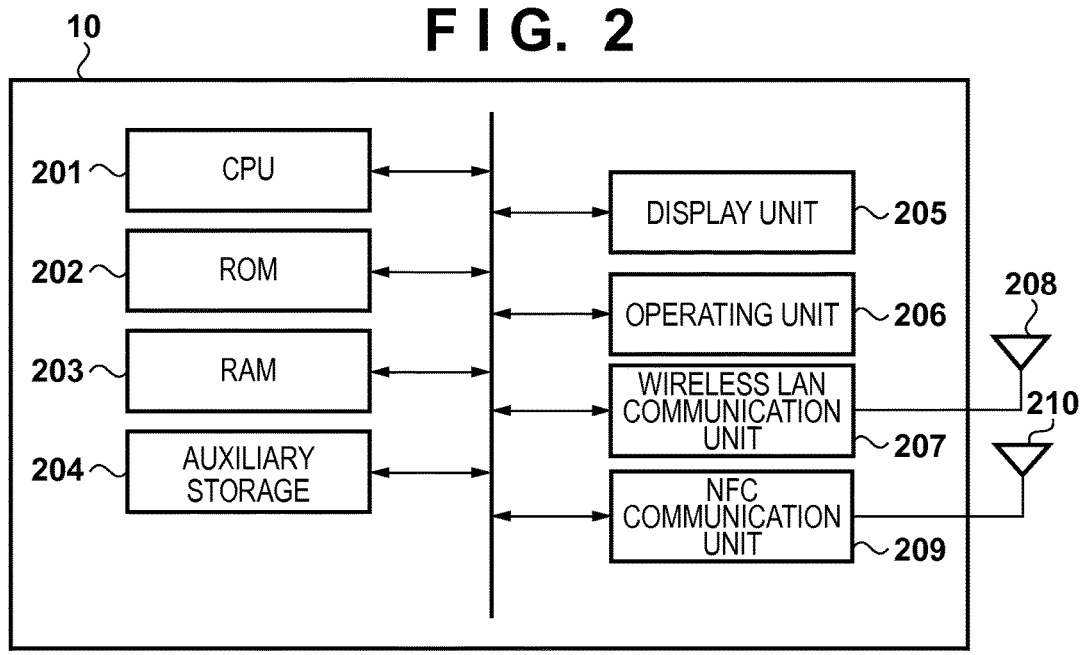
FIG. 2 is a diagram illustrating an example of the hardware configuration of a communication apparatus 10 according to the first embodiment.

Next, constituent elements of the authorization system according to the present embodiment will be described in detail. FIG. 2 is a block diagram illustrating an example of the hardware configuration of the communication apparatus 10 according to the present embodiment. The communication apparatus 10 includes a CPU (Central Processing Unit) 201, a ROM (Read-Only Memory) 202, a RAM (Random Access Memory) 203, auxiliary storage 204, a display unit 205, an operating unit 206, a wireless LAN communication unit 207, a wireless LAN antenna 208, an NFC communication unit 209, and an NFC antenna 210. The CPU 201 controls the communication apparatus 10 as a whole. The ROM 202 stores programs, parameters, and so on that do not need to undergo changes. The RAM 203 temporarily stores programs, data, and so on supplied from the auxiliary storage 204 or the like.

The auxiliary storage 204 stores configuration data such as wireless parameters, content data such as images and videos, and the like. A memory card, a hard disk, and the like can be given as examples of the auxiliary storage 204. The display unit 205 displays a GUI (Graphical User Interface) through which the user operates the communication apparatus 10. The operating unit 206 is an input interface through which the user makes input operations to the communication apparatus 10. The wireless LAN communication unit 207 controls the wireless LAN antenna 208 and carries out wireless LAN communication with the relay apparatus 20. The NFC communication unit 209 controls the NFC antenna 210 and carries out NFC communication with the relay apparatus 20.

Figure 4:
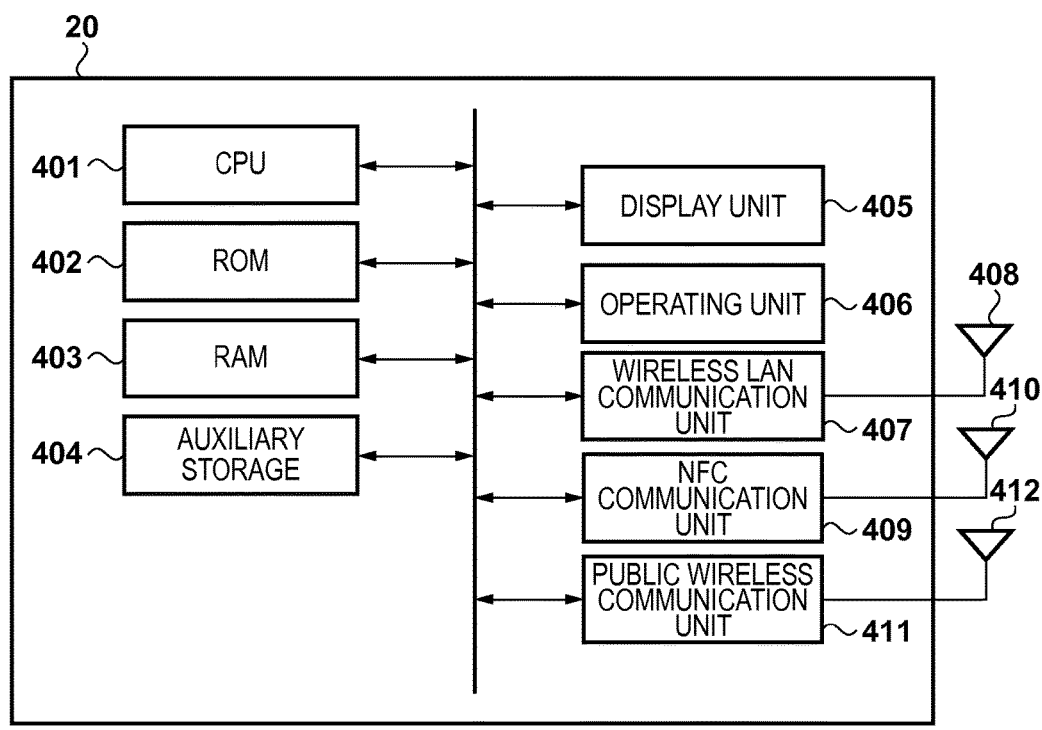
FIG. 4 is a diagram illustrating an example of the hardware configuration of a relay apparatus 20 according to the first embodiment.

FIG. 4 is a block diagram illustrating an example of the hardware configuration of the relay apparatus 20 according to the present embodiment. With respect to the hardware of the relay apparatus 20, descriptions of hardware that is the same as that in the communication apparatus 10 illustrated in FIG. 2 will be omitted, and only the differences will be mentioned. The relay apparatus 20 includes a CPU 401, a ROM 402, a RAM 403, auxiliary storage 404, a display unit 405, an operating unit 406, a wireless LAN communication unit 407, a wireless LAN antenna 408, an NFC communication unit 409, an NFC antenna 410, a public wireless communication unit 411, and a public wireless antenna 412. The public wireless communication unit 411 controls the public wireless antenna 412 and carries out public wireless communication with the authorization server 50 and the resource server 60.

Figure 3:
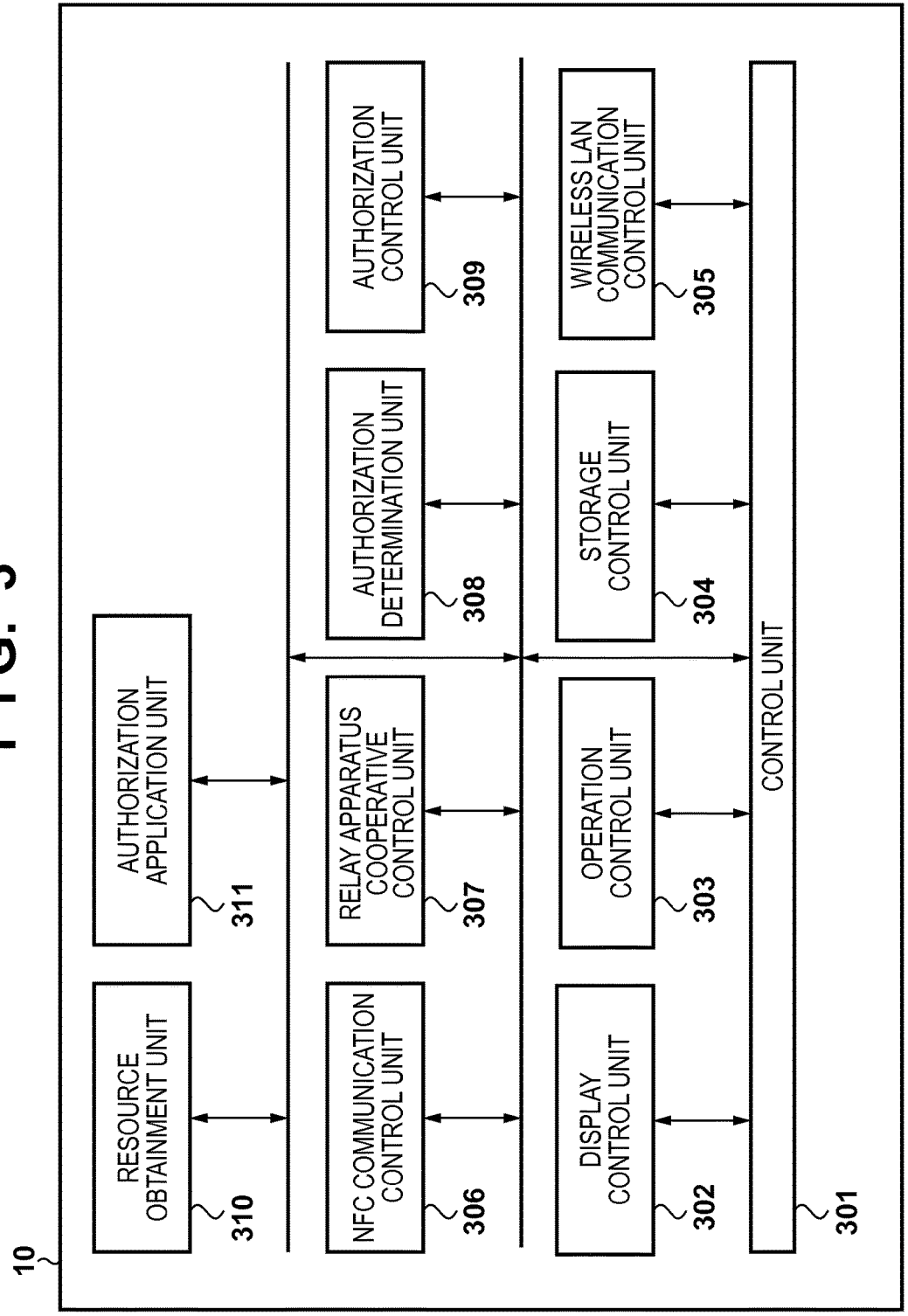
FIG. 3 is a diagram illustrating an example of the functional module configuration of the communication apparatus 10 according to the first embodiment.

FIG. 3 is a block diagram illustrating an example of the functional module configuration of the communication apparatus 10 according to the present embodiment. The communication apparatus 10 includes a control unit 301, a display control unit 302, an operation control unit 303, a storage control unit 304, a wireless LAN communication control unit 305, an NFC communication control unit 306, a relay apparatus cooperative control unit 307, an authorization determination unit 308, an authorization control unit 309, and a resource obtainment unit 310.

The control unit 301 carries out overall control of the respective functional modules provided in the communication apparatus 10. The display control unit 302 controls the display unit 205 and carries out display control for the GUI in the communication apparatus 10. The operation control unit 303 controls the operating unit 206 and carries out control for operational inputs made by the user in the communication apparatus 10. The storage control unit 304 controls the auxiliary storage 204 and stores image content data, video content data, and the like.

The wireless LAN communication control unit 305 controls the wireless LAN communication unit 207 and controls the wireless LAN communication with the relay apparatus 20. In the present embodiment, the wireless LAN communication control unit 305 controls the wireless LAN communication with the relay apparatus 20 according to the WPS (Wi-Fi Protected Access) method. Although the WPS method is used in the present embodiment, the invention is not limited thereto, and another wireless LAN communication standard such as WPA (Wi-Fi Protected Access), WPA2, Wi-Fi Direct, or the like may be used instead.

The NFC communication control unit 306 controls the NFC communication unit 209 and controls the NFC communication with the relay apparatus 20. The NFC communication control unit 306 sends communication apparatus information regarding the communication apparatus 10 to the relay apparatus 20 and receives relay apparatus information regarding the relay apparatus 20 from the relay apparatus 20. Although the NFC communication method is used in the present embodiment, the invention is not limited thereto, and another short-range wireless communication method such as BT (Bluetooth (registered trademark)), BT-LE (Bluetooth (registered trademark) Low Energy), or the like may be used instead.

The relay apparatus cooperative control unit 307 carries out cooperative control with the relay apparatus 20 by using the wireless LAN communication control unit 305 and the NFC communication control unit 306. Specifically, the relay apparatus cooperative control unit 307 carries out discovery control for discovering and advertising devices on the wireless LAN, service control for using and providing services provided by those devices, and so on. In the present embodiment, the relay apparatus cooperative control unit 307 carries out the discovery and advertisement using SSDP (Simple Service Discovery Protocol). Meanwhile, the relay apparatus cooperative control unit 307 provides and controls services through HTTP (HyperText Transfer Protocol). Although the relay apparatus cooperative control unit 307 uses SSDP and HTTP in the present embodiment, the invention is not limited thereto, and other discovery and service communication standards, such as mDNS (Multicast Dynamic Name Service), UPnP (Universal Plug And Play), DLNA (Digital Living Network Alliance), SOAP, REST (Representational State Transfer), AtomPub (Atom Publishing Protocol), or the like, may be used instead.

The authorization determination unit 308 determines whether or not to carry out an authorization process. The authorization control unit 309 carries out the authorization process between the relay apparatus 20 and the authorization server 50 using the wireless LAN communication control unit 305. In the present embodiment, the authorization control unit 309 carries out the authorization process according to the OAuth 2.0 method.

Figure 20A:
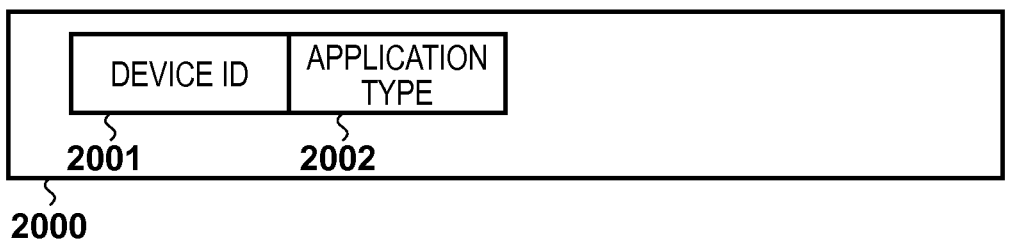
FIGS. 20A-20H are diagrams illustrating examples of data structures related to the first embodiment.
Figure 20B:
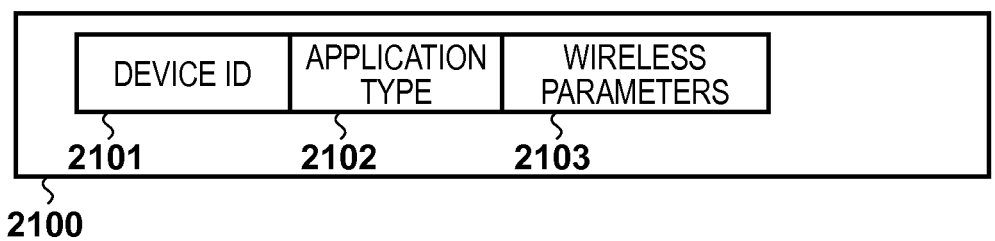
Figure 20C:
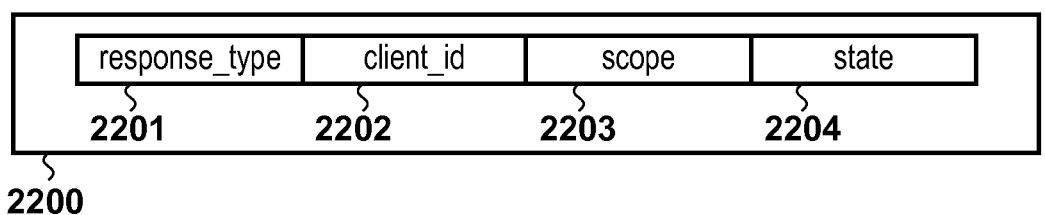

Specifically, the authorization control unit 309 generates an authorization relay request based on authorization relay request information 2200 illustrated in FIG. 20C, and sends the authorization relay request to an authorization relay service provided by the relay apparatus 20. The authorization control unit 309 then receives, from the relay apparatus 20, an authorization relay response based on authorization relay response information 2500 illustrated in FIG. 20F. Thereafter, the authorization control unit 309 generates an access token request based on access token request information 2600 illustrated in FIG. 20G, and sends the access token request to the authorization server 50. The authorization control unit 309 then receives, from the authorization server 50, an access token response based on access token response information 2700 illustrated in FIG. 20H. Although the authorization control unit 309 uses the OAuth 2.0 method in the present embodiment, the invention is not limited thereto, and another authorization method such as OAuth 1.0, OpenID Connect, SAML (Security Assertion Markup Language), Kerberos, or the like may be used instead.

The resource obtainment unit 310 obtains a resource from the resource server 60 via the relay apparatus 20 using the wireless LAN communication control unit 305. In the present embodiment, "resource" refers to a resource according to REST. Specifically, "resource" refers to content data such as electronic files, electronic data, images/videos, and so on, as well as metadata regarding containers and content such as directories and albums, and the like. Furthermore, functions, actions, and APIs (Application Program Interfaces) for various services provided by the resource server 60 (storage, content sharing, printing, payments, and the like) can also be realized as resources. Further still, although the resource obtainment unit 310 obtains (downloads) the resources in the present embodiment, the invention is not limited thereto, and other resource operations such as generating (uploading), updating, deleting, and so on, which are basic operations according to REST, may be carried out as well. An authorization application unit 311 is an application that enables the user 30 to authorize the communication apparatus 10.

Figure 5:
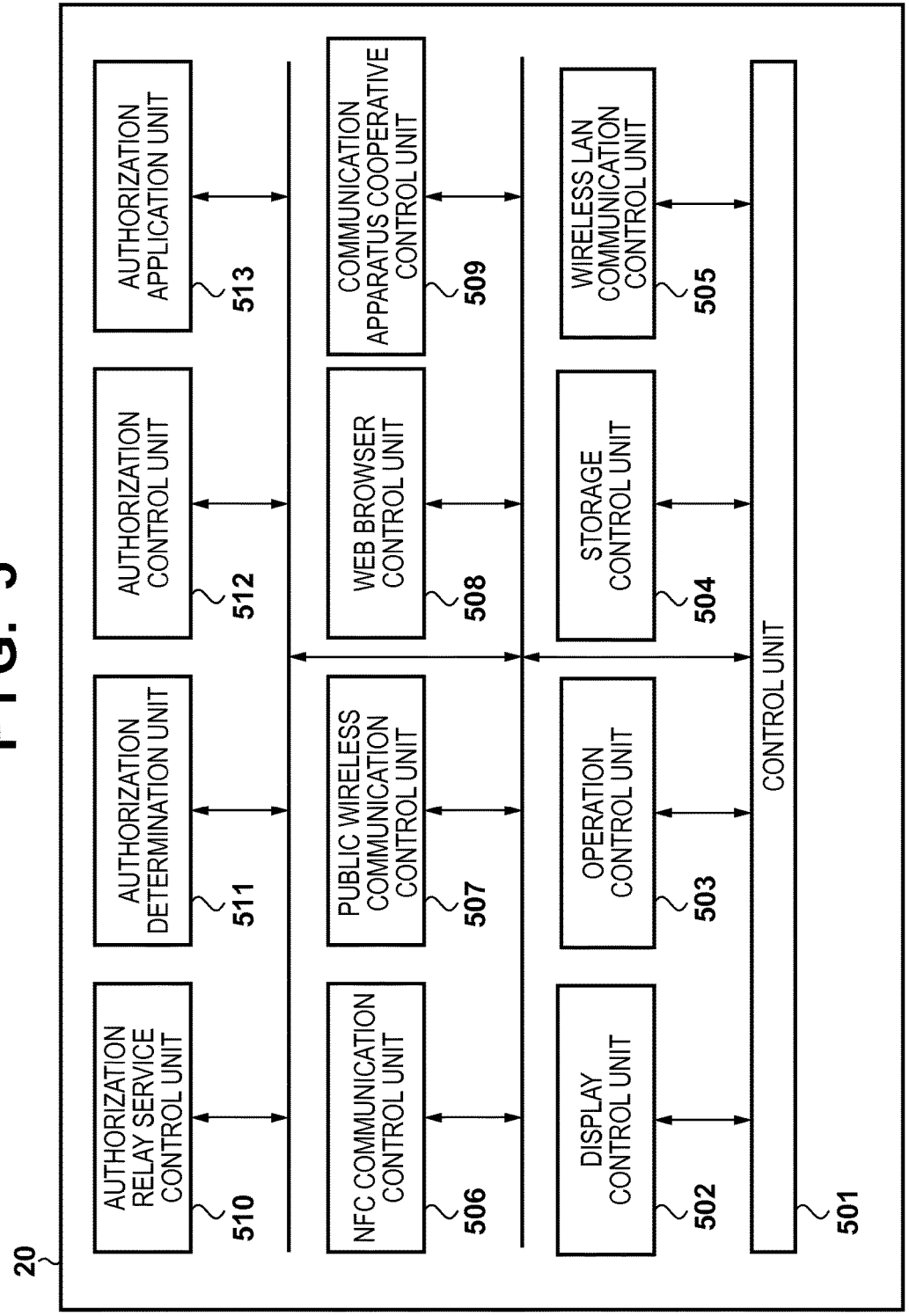
FIG. 5 is a diagram illustrating an example of the functional module configuration of the relay apparatus 20 according to the first embodiment.

FIG. 5 is a block diagram illustrating an example of the functional module configuration of the relay apparatus 20 according to the present embodiment. With respect to the functional modules of the relay apparatus 20, descriptions of functional modules that are the same as those in the communication apparatus 10 illustrated in FIG. 3 will be omitted, and only the differences will be mentioned.

The relay apparatus 20 includes a control unit 501, a display control unit 502, an operation control unit 503, a storage control unit 504, a wireless LAN communication control unit 505, an NFC communication control unit 506, a public wireless communication control unit 507, a web browser control unit 508, a communication apparatus cooperative control unit 509, an authorization relay service control unit 510, an authorization determination unit 511, and an authorization control unit 512.

The NFC communication control unit 506 controls the NFC communication unit 409 and controls the NFC communication with the communication apparatus 10. The NFC communication control unit 506 receives the communication apparatus information regarding the communication apparatus 10 from the communication apparatus 10 and sends the relay apparatus information regarding the relay apparatus 20 to the communication apparatus 10. The public wireless communication control unit 507 controls the public wireless communication unit 411, connects to the network 40, and carries out communication between the authorization server 50 and the resource server 60. Although the public wireless communication control unit 507 uses a public wireless communication method in the present embodiment, the invention is not limited thereto, and another communication standard such as wireless LAN, wired LAN, WAN, or the like may be used instead.

The web browser control unit 508 controls the display control unit 502 and displays a web browser. In the present embodiment, the web browser control unit 508 is used when displaying a user authentication screen and an access authority granting screen, written in HTML (HyperText Markup Language) as a predetermined format, provided by the authorization server 50. The communication apparatus cooperative control unit 509 is the same as the relay apparatus cooperative control unit 307 illustrated in FIG. 3, and carries out cooperative control with the communication apparatus 10.

The authorization relay service control unit 510 provides the authorization relay service to the communication apparatus 10 using the communication apparatus cooperative control unit 509. In the present embodiment, the authorization relay service control unit 510 receives, from the communication apparatus 10, the authorization relay request based on the authorization relay request information 2200 illustrated in FIG. 20C. The authorization relay service control unit 510 then carries out the authorization process with the authorization server 50 using the authorization control unit 512. Then, the authorization relay service control unit 510 generates the authorization relay response information 2500 illustrated in FIG. 20F based on an authorization result from the authorization server 50, and sends the authorization relay response to the communication apparatus 10.

The authorization determination unit 511 determines whether or not to carry out the authorization process. The authorization control unit 512 carries out the authorization process with the authorization server 50 using the wireless LAN communication control unit 505. In the present embodiment, the authorization control unit 512 carries out the authorization process according to the OAuth 2.0 method, in the same manner as the authorization control unit 309 illustrated in FIG. 3. Specifically, the authorization control unit 512 generates an authorization request based on authorization request information 2300 illustrated in FIG. 20D, and sends the authorization request to the authorization server 50. Thereafter, the authorization control unit 512 carries out user authentication and access authority granting with the authorization server 50. Then, as a result, the authorization control unit 512 receives an authorization response based on authorization response information 2400 illustrated in FIG. 20E. Although the authorization control unit 512 uses the OAuth 2.0 method in the present embodiment, the invention is not limited thereto, and another authorization method may be used in the same manner as the authorization control unit 309 illustrated in FIG. 3. Note also that the functional blocks illustrated in FIG. 3, 5, and so on are not limited to being provided by software, and may be provided by hardware instead. The functional blocks illustrated in FIGS. 3, 5, and so on are interrelated. Further still, the functional blocks illustrated in FIGS. 3, 5, and so on are examples; a single functional block may be made up of multiple functional blocks, and any of the functional blocks may be further divided into blocks that perform multiple functions.

FIG. 20A is a diagram illustrating an example of the data structure of the communication apparatus information according to the present embodiment. Communication apparatus information 2000 corresponds to the overall communication apparatus information according to the present embodiment. A device ID 2001 is an identifier that uniquely specifies the communication apparatus 10. This is, for example, a MAC (Media Access Control) address, a product serial number, or the like. Meanwhile, the device ID 2001 may be issued to the communication apparatus 10 by the authorization server 50 prior to the authorization process described in the present embodiment. Application type 2002 indicates the type of an application requested to be executed by the relay apparatus 20. In the present embodiment, the application type 2002 is information indicating an authorization application.

FIG. 20B is a diagram illustrating an example of the data structure of the relay apparatus information according to the present embodiment. With respect to the relay apparatus information, descriptions of data items that are the same as those in the communication apparatus information illustrated in FIG. 20A will be omitted, and only the differences will be mentioned. Relay apparatus information 2100 corresponds to the overall relay apparatus information according to the present embodiment. Wireless parameters 2103 are information regarding a wireless LAN access point necessary for wireless LAN communication with the relay apparatus 20. Specifically, this information is a SSID (Service Set Identifier), an encrypted communication method, an encryption key, a wireless LAN communication method, or the like.

FIG. 6 is a sequence chart illustrating an overall example of messages in the authorization system according to the present embodiment. In M601, the communication apparatus 10 and the relay apparatus 20 connect wirelessly. Details are illustrated in FIG. 7. In M602, the communication apparatus 10, the relay apparatus 20, and the authorization server 50 carry out authorization. Details are illustrated in FIG. 8. In M603, the communication apparatus 10 obtains a resource from the resource server 60. Details are illustrated in FIG. 9. In M604, the communication apparatus 10 and the relay apparatus 20 cut the wireless connection. Details are illustrated in FIG. 10.

FIG. 7 is a sequence chart illustrating an example of messages exchanged during a wireless connection between the communication apparatus 10 and the relay apparatus 20 according to the present embodiment.

In M701, the user 30 operates the communication apparatus 10 and instructs the authorization application to be executed. In M702, the communication apparatus 10 executes the authorization application unit 311 and starts the authorization of the communication apparatus 10. The authorization application unit 311 generates the communication apparatus information 2000 specifying the authorization application in the application type 2002. The authorization application unit 311 then uses the NFC communication control unit 306 to establish an NFC communication-capable state. Meanwhile, at this time, the authorization application unit 311 uses the display control unit 302 to display a message, to the user 30, indicating that the communication apparatus 10 and the relay apparatus 20 should be touched in order to start the NFC communication.

In M703, the user 30 touches the communication apparatus 10 to the relay apparatus 20. In M704, the communication apparatus 10 and the relay apparatus 20 detect each other's NFC communication. In M705, the communication apparatus 10 sends the communication apparatus information 2000 to the relay apparatus 20 using the NFC communication control unit 306. Meanwhile, the relay apparatus 20 receives the communication apparatus information 2000 from the communication apparatus 10 using the NFC communication control unit 506. In M706, the relay apparatus 20 refers to the application type 2002 in the communication apparatus information 2000 received through the NFC communication and executes the instructed authorization application unit 513. The authorization application unit 513 generates the relay apparatus information 2100 specifying information necessary for wireless LAN communication with the relay apparatus 20 as the wireless parameters 2103.

In M707, the relay apparatus 20 sends the relay apparatus information 2100 to the communication apparatus 10 using the NFC communication control unit 506. Meanwhile, the communication apparatus 10 receives the relay apparatus information 2100 from the relay apparatus 20 using the NFC communication control unit 306. In M708, the relay apparatus 20 starts a wireless LAN communication tethering mode (called "wireless LAN tethering" hereinafter) based on the wireless parameters 2103, using the wireless LAN communication control unit 505 and the public wireless communication control unit 507.

In M709, the relay apparatus 20 starts the authorization relay service using the authorization relay service control unit 510. In M710, the communication apparatus 10 starts wireless LAN communication with the relay apparatus 20 based on the wireless parameters 2103 in the received relay apparatus information 2100, using the wireless LAN communication control unit 305. In M711, the communication apparatus 10 broadcasts the presence of the communication apparatus 10 on the wireless LAN using the relay apparatus cooperative control unit 307. Specifically, the relay apparatus cooperative control unit 307 sends an SSDP: alive message on the wireless LAN.

In M712, the relay apparatus 20 receives the message broadcast by the communication apparatus 10 in M711 and discovers the communication apparatus 10, using the communication apparatus cooperative control unit 509. In M713, the relay apparatus 20 broadcasts the presence of the relay apparatus 20 on the wireless LAN and the presence of the authorization relay service, using the communication apparatus cooperative control unit 509 and the authorization relay service control unit 510. Specifically, the communication apparatus cooperative control unit 509 sends an SSDP: alive message on the wireless LAN, in the same manner as in M711. In M714, the communication apparatus 10 receives the message broadcast by the relay apparatus 20 in M713 and discovers the relay apparatus 20 and the authorization relay service, using the relay apparatus cooperative control unit 307.

FIG. 8 is a sequence chart illustrating an example of messages exchanged when carrying out authorization in the authorization system according to the present embodiment.

In M801, the communication apparatus 10 determines whether or not to carry out the authorization process using the authorization determination unit 308. In FIG. 8, the authorization determination unit 308 determines to carry out the authorization process. In M802, the communication apparatus 10 sends the authorization relay request to the authorization relay service of the relay apparatus 20 using the authorization control unit 309. The relay apparatus 20 receives the authorization relay request from the communication apparatus 10 using the authorization relay service control unit 510.

In M803, the relay apparatus 20 generates the authorization request specifying the authorization code grant type according to OAuth 2.0 based on the authorization relay request received from the communication apparatus 10, using the authorization relay service control unit 510. Then, the relay apparatus 20 sends the generated authorization request to the authorization server 50 using the authorization control unit 512. Although the relay apparatus 20 sends the authorization request specifying the authorization grant type in the present embodiment, the invention is not limited thereto, and another grant type according to OAuth 2.0, such as the implicit grant type, the resource owner password credential grant type, the client credential grant type, or the like, may be used instead. The authorization server 50 receives the authorization request from the relay apparatus 20.

In M804, in response to the authorization request from the relay apparatus 20, the authorization server 50 issues a request for user authentication to the relay apparatus 20. Specifically, the authorization server 50 sends user authentication screen data written in HTML to the relay apparatus 20. In the present embodiment, the user authentication requested by the authorization server 50 employs HTTP digest authentication using a user ID and a password. Although the authorization server 50 carries out user authentication using HTTP digest authentication in the present embodiment, the invention is not limited thereto, and another authentication method such as HTTP basic authentication, OpenID, a client certificate, multifactor authentication, biometric authentication, or the like may be used instead. In M805, the relay apparatus 20 displays the received user authentication screen in the display unit 405 using the web browser control unit 508.

In M806, the user 30 inputs a user ID and a password as user authentication information, using the operating unit 406 of the relay apparatus 20. In M807, the relay apparatus 20 uses the HTTP digest authentication method to send, to the authorization server 50, the user authentication information (user ID, password) input by the user 30, using the web browser control unit 508. The authorization server 50 then carries out the user authentication based on the user authentication information received from the relay apparatus 20. In M808, the authorization server 50 sends, to the relay apparatus 20, the access authority granting screen written in HTML.

In M809, the relay apparatus 20 displays the received access authority granting screen in the display unit 405 using the web browser control unit 508. In M810, the user 30 presses an authorize button displayed in the access authority granting screen, using the operating unit 406 of the relay apparatus 20. In M811, the relay apparatus 20 notifies the authorization server 50 that access authority has been granted using the web browser control unit 508. In the present embodiment, the notification that the access authority has been granted is controlled by a JavaScript (registered trademark) program embedded in the access authority granting screen received from the authorization server 50. The authorization server 50 then receives the notification that the access authority has been granted from the relay apparatus 20 and determines to grant authorization to the communication apparatus 10.

In M812, the authorization server 50 sends, to the relay apparatus 20, an authorization response in response to the authorization request received in M803. The relay apparatus 20 receives the authorization response from the authorization server 50 using the authorization control unit 512. In M813, the relay apparatus 20 generates the authorization relay response based on the authorization response received from the authorization server 50, using the authorization relay service control unit 510. The authorization relay service control unit 510 then sends, to the communication apparatus 10, the authorization relay response corresponding to the authorization relay request received in M802. The communication apparatus 10 receives the authorization relay response from the relay apparatus 20 using the authorization control unit 309.

In M814, the communication apparatus 10 obtains an access token endpoint and an authorization code from the authorization relay response using the authorization control unit 309. The communication apparatus 10 sends, to the authorization server 50, the access token request based on the obtained access token endpoint and authorization code, using the authorization control unit 309. The authorization server 50 receives the access token request from the communication apparatus 10.

In M815, the authorization server 50 sends, to the communication apparatus 10, the access token response corresponding to the access token request received in M814. Then, the communication apparatus 10 receives the access token response from the authorization server 50 and obtains the access token and the refresh token, using the authorization control unit 309. In M816, the communication apparatus 10 stores the obtained access token and refresh token using the storage control unit 304. In M817, the communication apparatus 10 notifies the authorization relay service of the relay apparatus 20 that the authorization has succeeded, using the authorization control unit 309. The relay apparatus 20 receives the notification that the authorization has succeeded from the communication apparatus 10 using the authorization relay service control unit 510.

FIG. 9 is a sequence chart illustrating an example of messages exchanged when the communication apparatus 10 obtains a resource from the resource server 60 according to the present embodiment.

In M901, the user 30 operates the communication apparatus 10 and instructs the specified resource to be obtained from the resource server 60. In M902, the communication apparatus 10 determines whether or not an access token is held, using the authorization determination unit 308. In FIG. 9, it is assumed that the communication apparatus 10 holds an access token.

In M903, the communication apparatus 10 issues, to the resource server 60 via the relay apparatus 20, a request to obtain the specified resource, using the resource obtainment unit 310. When making the resource obtainment request, the resource obtainment unit 310 sends the request along with the access token that is held to the resource server 60. The resource server 60 receives the resource obtainment request and the access token from the communication apparatus 10.

In M904, the resource server 60 issues a request to the authorization server 50 for access token information regarding the access token received from the communication apparatus 10. In M905, the authorization server 50 sends the requested access token information to the resource server 60. In M906, the resource server 60 verifies the validity of the access token received from the communication apparatus 10 based on the access token information received from the authorization server 50. Specifically, the resource server 60 verifies the expiration date of the access token, a scope (access authority range), and so on. In FIG. 9, the resource server 60 determines that the access token received from the communication apparatus 10 is valid. In M907, the resource server 60 sends the requested resource to the communication apparatus 10. The communication apparatus 10 receives the requested resource from the resource server 60.

FIG. 10 is a sequence chart illustrating an example of messages exchanged when a wireless connection between the communication apparatus 10 and the relay apparatus 20 is cut off according to the present embodiment.

In M1001, the communication apparatus 10 notifies the relay apparatus 20 that the communication apparatus 10 will exit from the wireless LAN, using the relay apparatus cooperative control unit 307. In M1002, the relay apparatus 20 detects the communication apparatus 10 exiting from the wireless LAN, using the communication apparatus cooperative control unit 509. In M1003, the communication apparatus 10 ends the wireless LAN communication with the relay apparatus 20 using the wireless LAN communication control unit 305. In M1004, the relay apparatus 20 stops the authorization relay service using the authorization relay service control unit 510. Furthermore, the relay apparatus 20 stops the wireless LAN tethering using the wireless LAN communication control unit 505 and the public wireless communication control unit 507.

Figure 11:
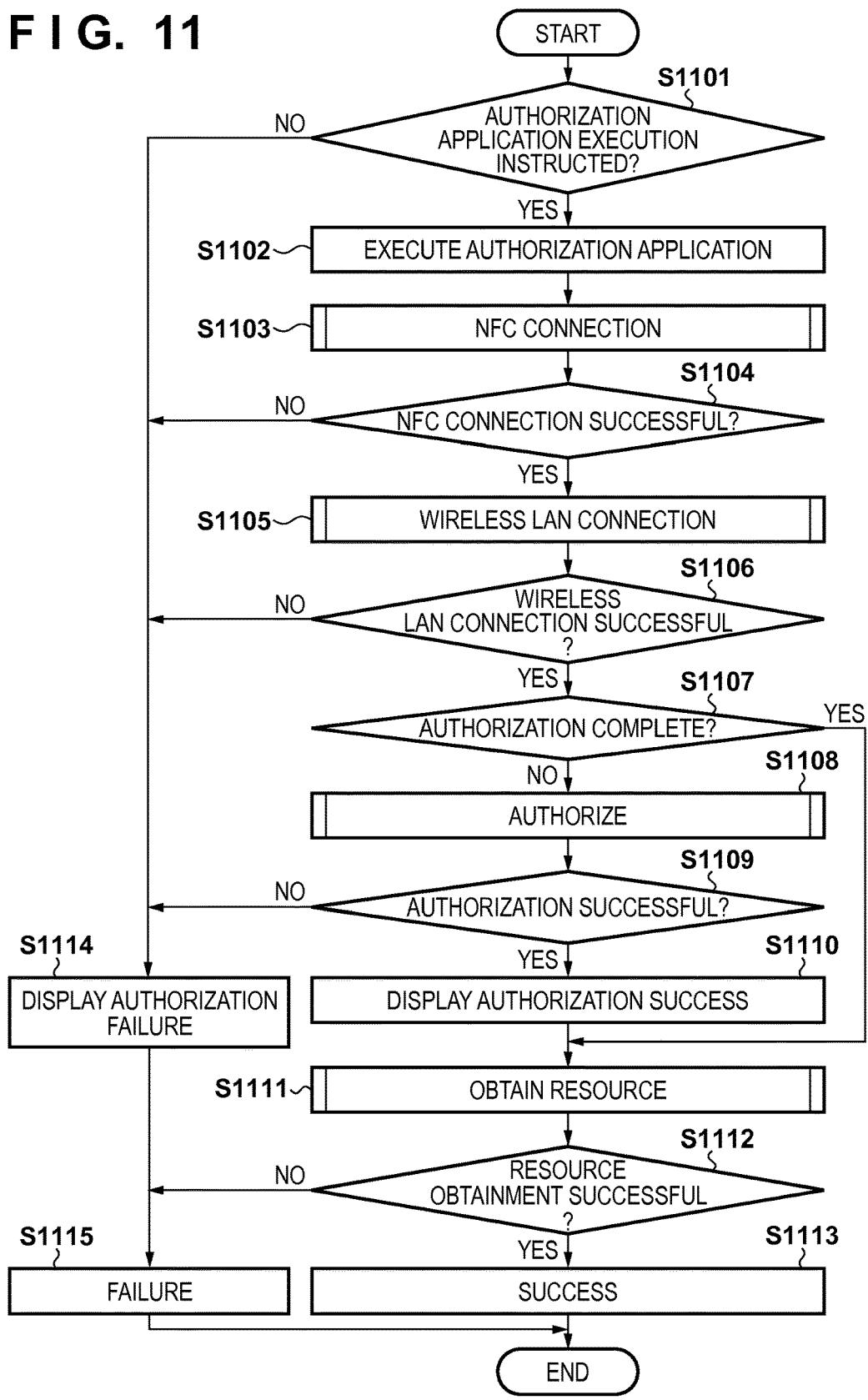
FIG. 11 is a flowchart illustrating an overall procedure performed by the communication apparatus 10 according to the first embodiment.

FIG. 11 is a flowchart illustrating an overall procedure for operations performed by the communication apparatus 10 according to the present embodiment.

In step S1101, the control unit 301 determines whether or not the execution of the authorization application has been instructed. In the case where the execution has been instructed (S1101; YES), the process moves to step S1102. On the other hand, in the case where the execution has not been instructed (S1101; NO), the process moves to step S1114. In step S1102, the authorization application unit 311 executes the authorization application. Then, the authorization application unit 311 generates the communication apparatus information 2000 specifying the authorization application in the application type 2002. The authorization application unit 311 then uses the NFC communication control unit 306 to establish an NFC communication-capable state.

Figure 13:
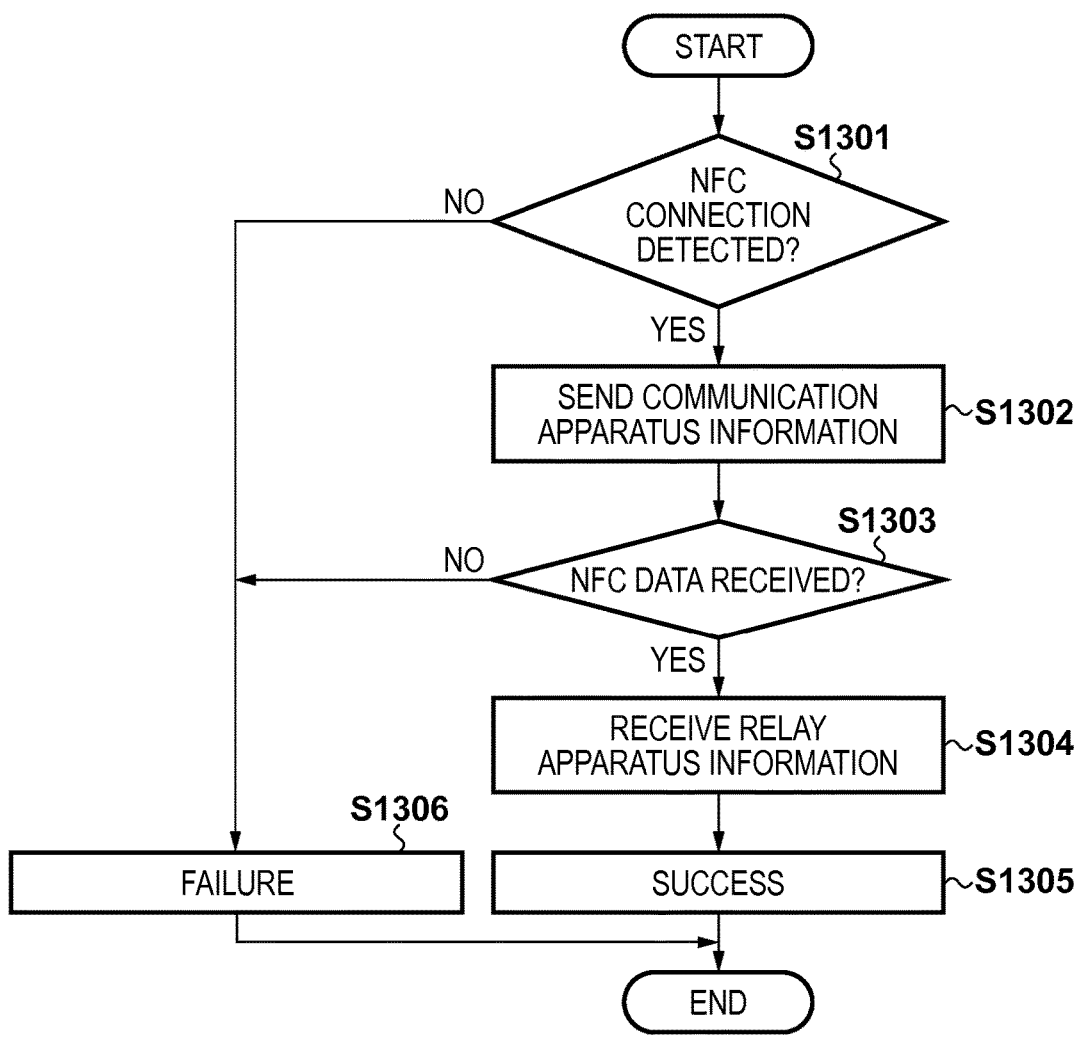
FIG. 13 is a flowchart illustrating a procedure performed by the communication apparatus 10 during an NFC connection according to the first embodiment.
Figure 15:
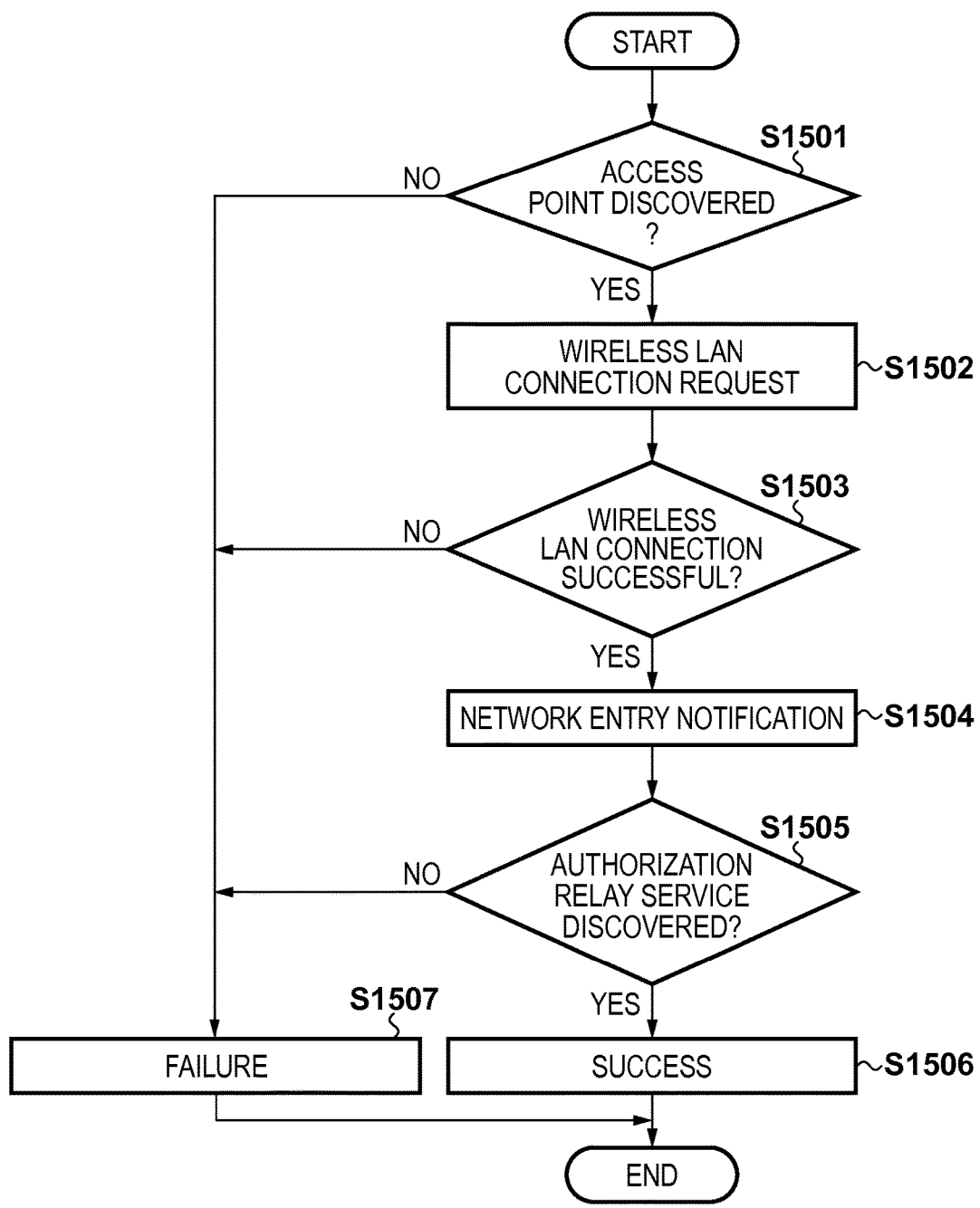
FIG. 15 is a flowchart illustrating a procedure performed by the communication apparatus 10 during a wireless LAN connection according to the first embodiment.

In step S1103, the communication apparatus 10 carries out NFC communication with the relay apparatus 20. Details are illustrated in FIG. 13. In step S1104, the NFC communication control unit 306 determines whether or not the NFC communication with the relay apparatus 20 has succeeded. In the case where the NFC communication has succeeded (S1104; YES), the process moves to step S1105. On the other hand, in the case where the NFC communication has failed (S1104; NO), the process moves to step S1114. In step S1105, the communication apparatus 10 carries out wireless LAN communication with the relay apparatus 20. Details are illustrated in FIG. 15.

In step S1106, the wireless LAN communication control unit 305 determines whether or not the wireless LAN communication with the relay apparatus 20 has succeeded. In the case where the wireless LAN communication has succeeded (S1106; YES), the process moves to step S1107. On the other hand, in the case where the wireless LAN communication has failed (S1106; NO), the process moves to step S1114.

Figure 17:
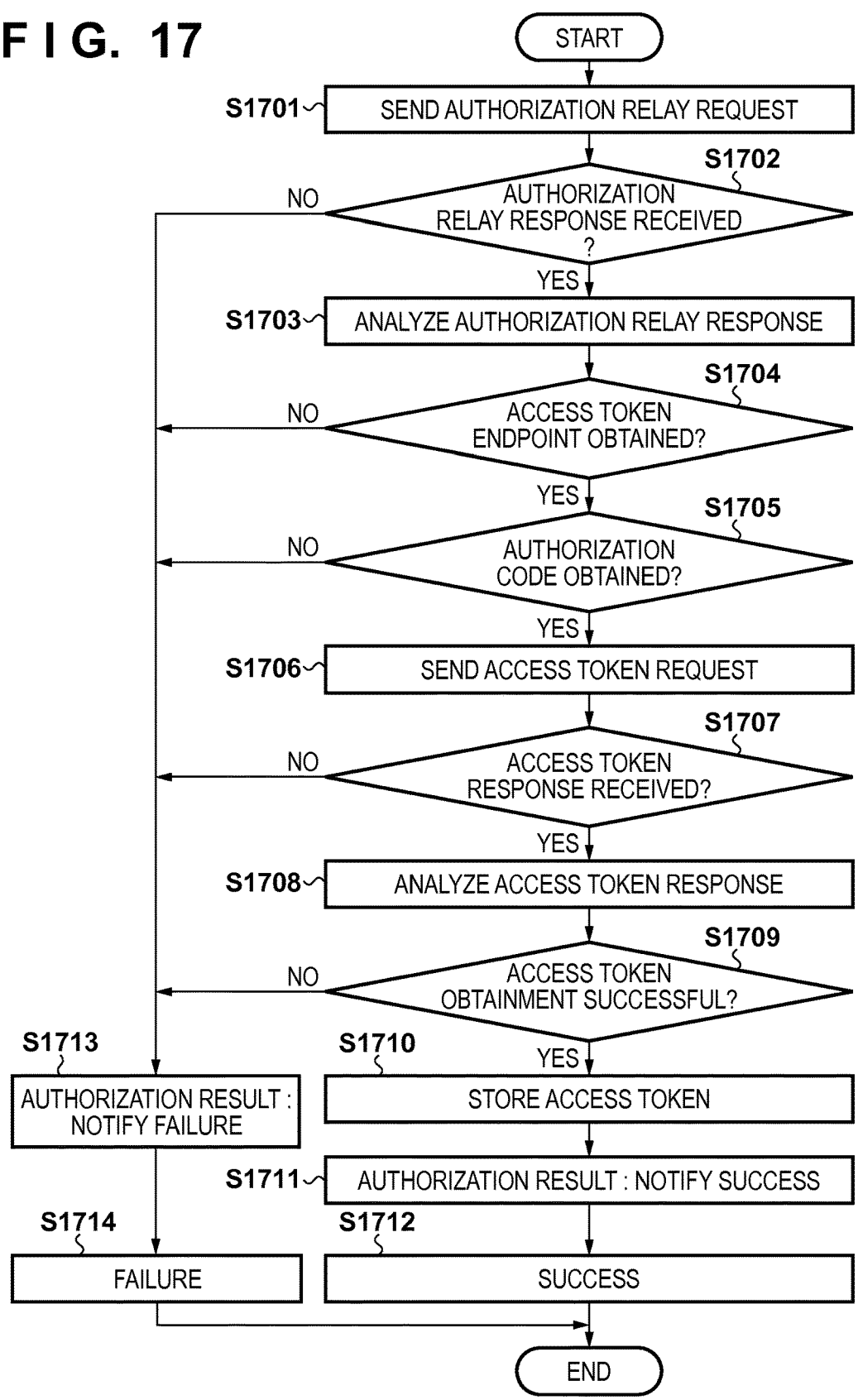
FIG. 17 is a flowchart illustrating a procedure performed by the communication apparatus 10 when executing authorization according to the first embodiment.

In step S1107, the authorization determination unit 308 determines whether or not authorization is complete. In the present embodiment, the authorization determination unit 308 determines that the authorization is complete in the case where an access token corresponding to the user 30 and the relay apparatus 20 is held, and determines that the authorization is not complete in the case where the access token is not held. In the case where the authorization is complete (S1107; YES), the process moves to step S1111. In the case where the authorization is not complete (S1107; NO), the process moves to step S1108. In step S1108, the communication apparatus 10 carries out the authorization process with the relay apparatus 20 and the authorization server 50. Details are illustrated in FIG. 17.

Figure 19:
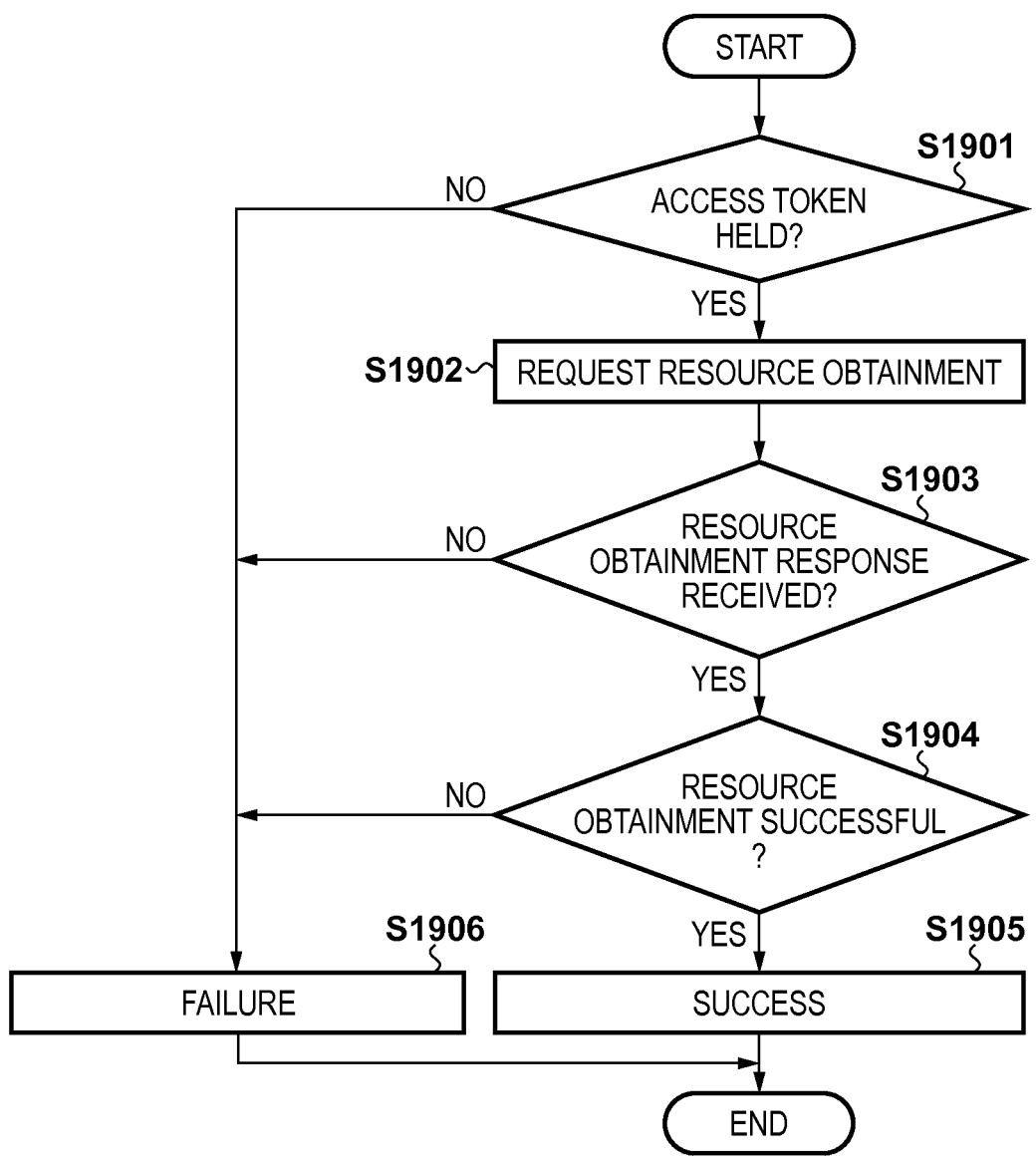
FIG. 19 is a flowchart illustrating a procedure performed by the communication apparatus 10 during resource obtainment according to the first embodiment.

In step S1109, the authorization determination unit 308 determines whether or not authorization has succeeded. In the case where the authorization has succeeded (S1109; YES), the process moves to step S1110. On the other hand, in the case where the authorization has failed (S1109; NO), the process moves to step S1114. In step S1110, the authorization application unit 311 displays a message indicating that the authorization has succeeded in the display unit 205 using the display control unit 302. In step S1111, the communication apparatus 10 obtains the specified resource from the resource server 60. Details are illustrated in FIG. 19.

In step S1112, the resource obtainment unit 310 determines whether or not the resource obtainment has succeeded. In the case where the resource obtainment has succeeded (S1112; YES), the process moves to step S1113. On the other hand, in the case where the resource obtainment has failed (S1112; NO), the process moves to step S1115. In step S1113, the control unit 301 ends the processing assuming that the authorization and the resource obtainment have succeeded. In step S1114, the authorization application unit 311 displays a message indicating that the authorization has failed in the display unit 205 using the display control unit 302. In step S1115, the control unit 301 ends the processing assuming that the authorization or the resource obtainment has failed.

Figure 12:
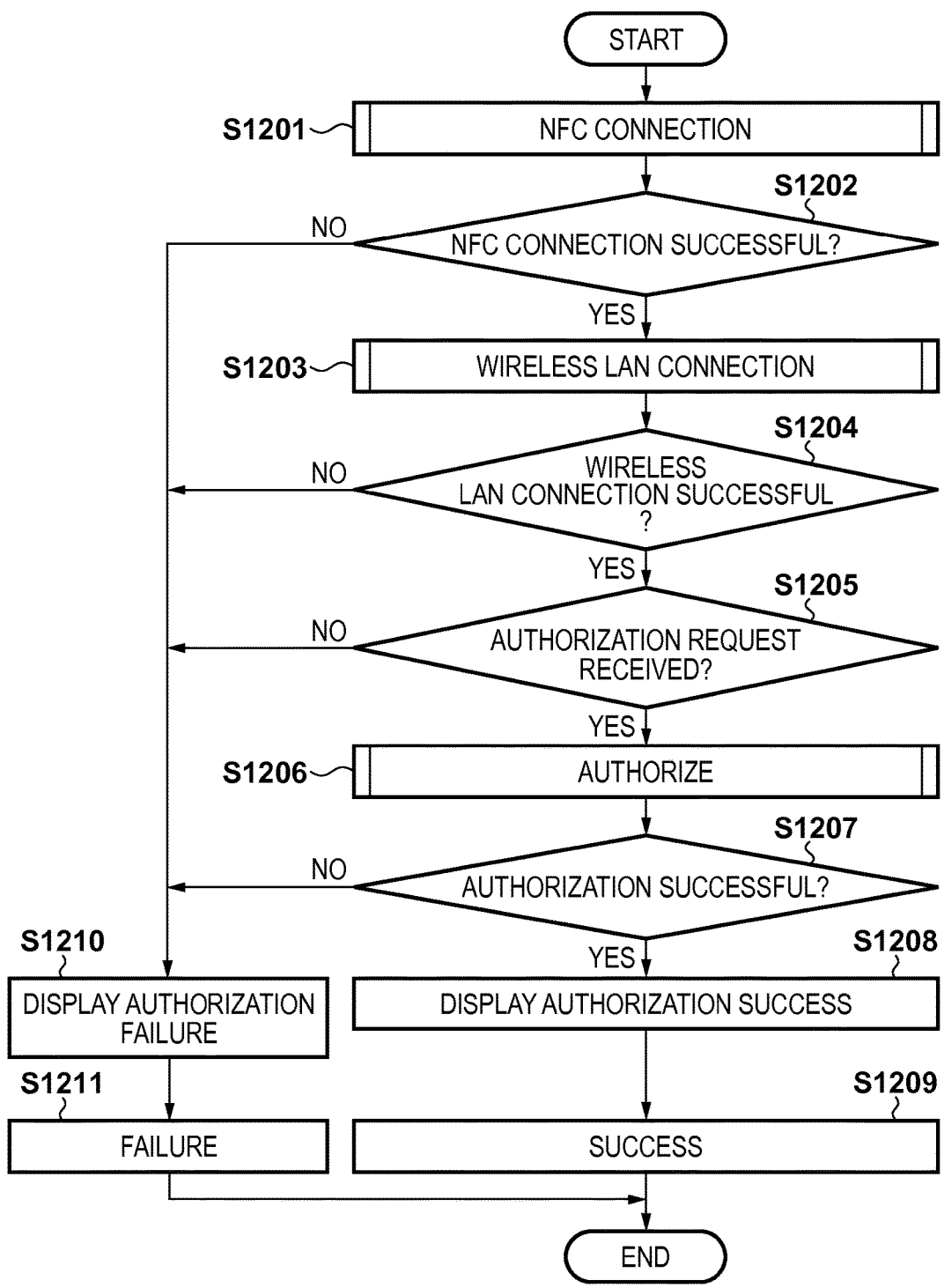
FIG. 12 is a flowchart illustrating an overall procedure performed by the relay apparatus 20 according to the first embodiment.

FIG. 12 is a flowchart illustrating an overall procedure for operations performed by the relay apparatus 20 according to the present embodiment.

Figure 14:
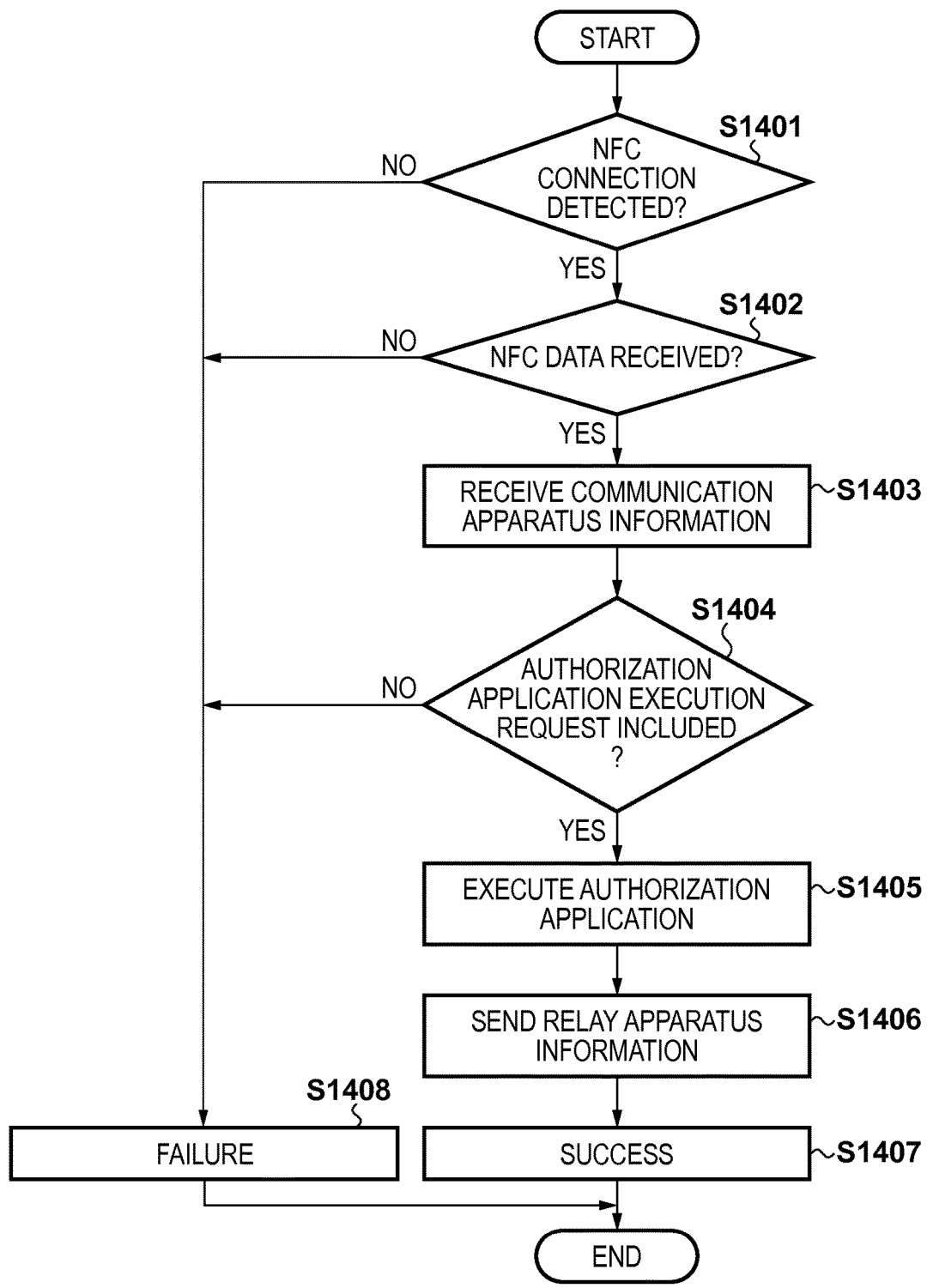
FIG. 14 is a flowchart illustrating a procedure performed by the relay apparatus 20 during an NFC connection according to the first embodiment.
Figure 16:
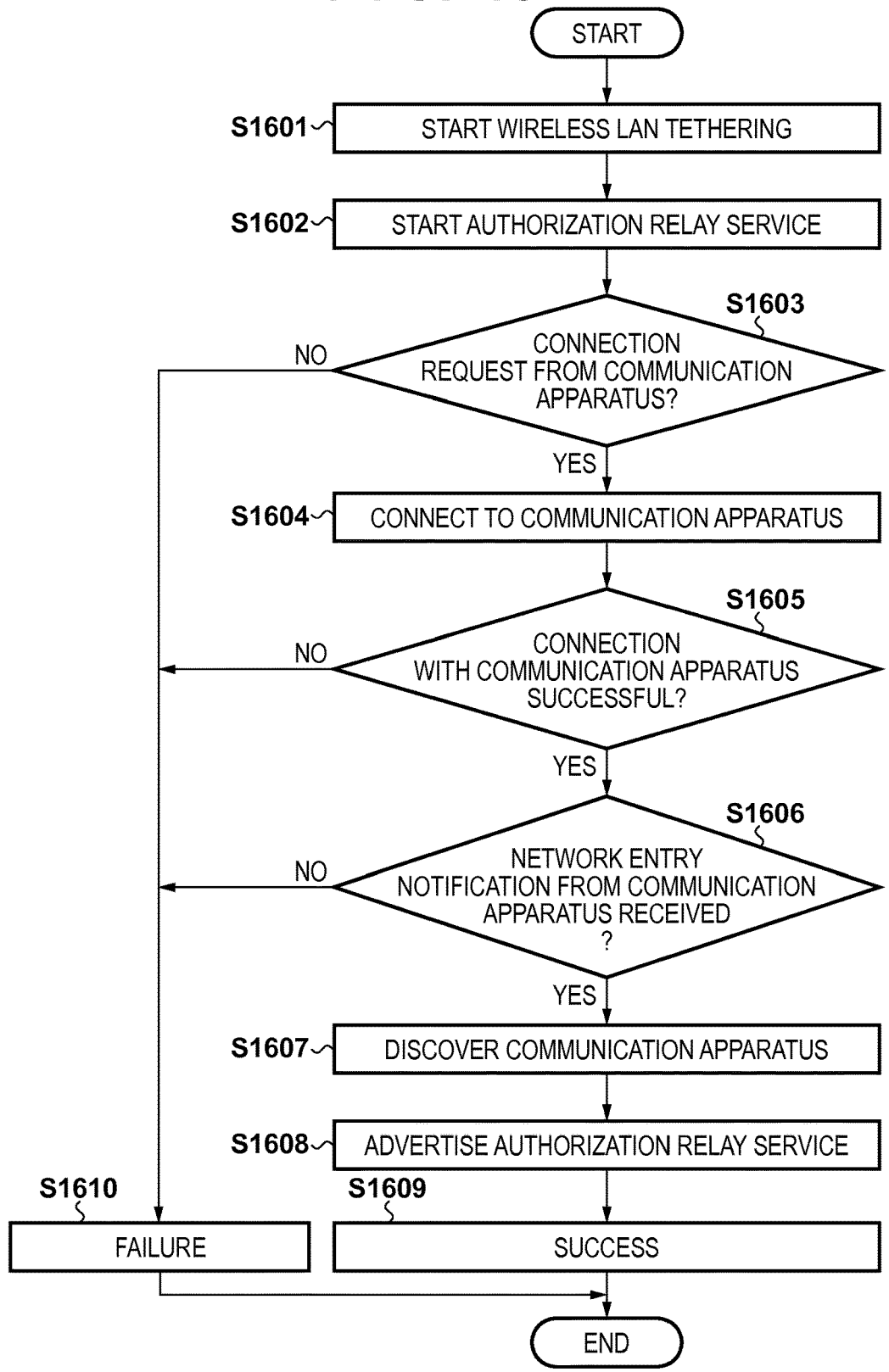
FIG. 16 is a flowchart illustrating a procedure performed by the relay apparatus 20 during a wireless LAN connection according to the first embodiment.

In step S1201, the relay apparatus 20 carries out NFC communication with the communication apparatus 10. Details are illustrated in FIG. 14. In step S1202, the NFC communication control unit 506 determines whether or not the NFC communication with the communication apparatus 10 has succeeded. In the case where the NFC communication has succeeded (S1202; YES), the process moves to step S1203. On the other hand, in the case where the NFC communication has failed (S1202; NO), the process moves to step S1210. In step S1203, the relay apparatus 20 carries out wireless LAN communication with the communication apparatus 10. Details are illustrated in FIG. 16.

In step S1204, the wireless LAN communication control unit 505 determines whether or not the wireless LAN communication with the communication apparatus 10 has succeeded. In the case where the wireless LAN communication has succeeded (S1204; YES), the process moves to step S1205. On the other hand, in the case where the wireless LAN communication has failed (S1204; NO), the process moves to step S1210. In step S1205, the authorization relay service control unit 510 determines whether or not the authorization relay request has been received from the communication apparatus 10. In the case where the authorization relay request has been received (S1205; YES), the process moves to step S1206. On the other hand, in the case where the authorization relay request has not been received (S1205; NO), the process moves to step S1210.

Figure 18:
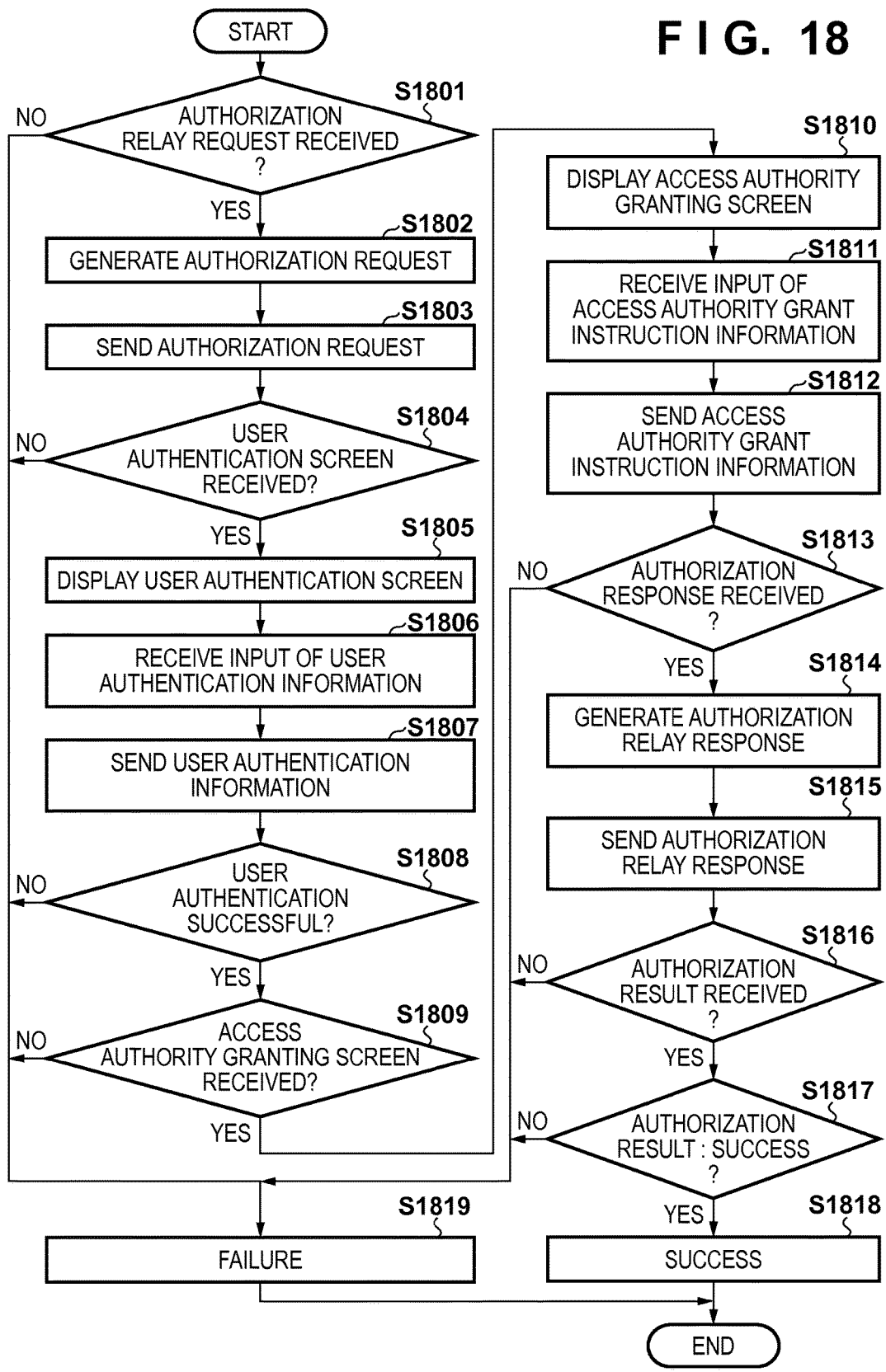
FIG. 18 is a flowchart illustrating a procedure performed by the relay apparatus 20 when executing authorization according to the first embodiment.

In step S1206, the relay apparatus 20 carries out the authorization process with the authorization server 50. Details are illustrated in FIG. 18. In step S1207, the authorization determination unit 511 determines whether or not authorization has succeeded. In the case where the authorization has succeeded (S1207; YES), the process moves to step S1208. On the other hand, in the case where the authorization has failed (S1207; NO), the process moves to step S1210. In step S1208, the authorization application unit 513 displays a message indicating that the authorization has succeeded in the display unit 405 using the display control unit 502. In step S1209, the control unit 501 ends the processing assuming that the authorization has succeeded.

In step S1210, the authorization application unit 513 displays a message indicating that the authorization has failed in the display unit 405 using the display control unit 502. In step S1211, the control unit 501 ends the processing assuming that the authorization has failed.

FIG. 13 is a diagram illustrating step S1103 of FIG. 11, and is a flowchart illustrating a procedure for operations performed by the communication apparatus 10 during an NFC connection according to the present embodiment.

In step S1301, the NFC communication control unit 306 determines whether or not an NFC communication connection with the relay apparatus 20 has been detected. In the case where the NFC communication connection has been detected (S1301; YES), the process moves to step S1302. On the other hand, in the case where the NFC communication connection has not been detected (S1301; NO), the process moves to step S1306.

In step S1302, the NFC communication control unit 306 sends the communication apparatus information 2000 to the relay apparatus 20. In step S1303, the NFC communication control unit 306 determines whether or not NFC communication data has been received from the relay apparatus 20. In the case where the NFC communication data has been received (S1303; YES), the process moves to step S1304. On the other hand, in the case where the NFC communication data has not been received (S1303; NO), the process moves to step S1306.

In step S1304, the NFC communication control unit 306 receives the relay apparatus information 2100 from the relay apparatus 20. In step S1305, the NFC communication control unit 306 ends the processing, assuming that the NFC communication with the relay apparatus 20 has succeeded. In step S1306, the NFC communication control unit 306 ends the processing, assuming that the NFC communication with the relay apparatus 20 has failed.

FIG. 14 is a diagram illustrating step S1202 of FIG. 12, and is a flowchart illustrating a procedure for operations performed by the relay apparatus 20 for an NFC connection according to the present embodiment.

In step S1401, the NFC communication control unit 506 determines whether or not an NFC communication connection with the communication apparatus 10 has been detected. In the case where the NFC communication connection has been detected (S1401; YES), the process moves to step S1402. On the other hand, in the case where the NFC communication connection has not been detected (S1401; NO), the process moves to step S1408.

In step S1402, the NFC communication control unit 506 determines whether or not the NFC communication data has been received from the communication apparatus 10. In the case where the NFC communication data has been received (S1402; YES), the process moves to step S1403. On the other hand, in the case where the NFC communication data has not been received (S1402; NO), the process moves to step S1408. In step S1403, the NFC communication control unit 506 receives the communication apparatus information 2000 from the communication apparatus 10.

In step S1404, the NFC communication control unit 506 determines whether or not the authorization application is specified in the application type 2002 of the received communication apparatus information 2000. In the case where the authorization application is specified (S1404; YES), the process moves to step S1405. On the other hand, in the case where the authorization application is not specified (S1404; NO), the process moves to step S1408.

In step S1405, the NFC communication control unit 506 executes the authorization application unit 513. The authorization application unit 513 generates the relay apparatus information 2100 specifying information necessary for wireless LAN communication with the relay apparatus 20 as the wireless parameters 2103. In step S1406, the NFC communication control unit 506 sends the relay apparatus information 2100 to the communication apparatus 10.

In step S1407, the NFC communication control unit 506 ends the processing, assuming that the NFC communication with the communication apparatus 10 has succeeded. In step S1408, the NFC communication control unit 506 ends the processing, assuming that the NFC communication with the communication apparatus 10 has failed.

FIG. 15 is a diagram illustrating step S1105 of FIG. 11, and is a flowchart illustrating a procedure for operations performed when the communication apparatus 10 makes a wireless LAN connection according to the present embodiment.

In step S1501, the wireless LAN communication control unit 305 determines whether or not the wireless LAN access point of the relay apparatus 20 has been discovered, based on the wireless parameters 2103 in the relay apparatus information 2100 received in step S1304 of FIG. 13. In the case where the access point has been discovered (S1501; YES), the process moves to step S1502. In the case where the access point could not be discovered (S1501; NO), the process moves to step S1507.

In step S1502, the wireless LAN communication control unit 305 requests a wireless LAN communication connection with the relay apparatus 20, based on the wireless parameters 2103 in the relay apparatus information 2100 received in step S1304 of FIG. 13. In step S1503, the wireless LAN communication control unit 305 determines whether or not the wireless LAN communication connection with the relay apparatus 20 has succeeded. In the case where the connection has succeeded (S1503; YES), the process moves to step S1504. In the case where the connection has failed (S1503; NO), the process moves to step S1507. In step S1504, the relay apparatus cooperative control unit 307 broadcasts the presence of the communication apparatus 10 on the wireless LAN.

In step S1505, the relay apparatus cooperative control unit 307 determines whether or not the relay apparatus 20 and the authorization relay service have been discovered on the wireless LAN. In the case where the items have been discovered (S1505; YES), the process moves to step S1506, whereas in the case where the items could not be discovered (S1506; NO), the process moves to step S1507. In step S1506, the wireless LAN communication control unit 305 determines to end the processing, assuming that the wireless LAN communication with the relay apparatus 20 has succeeded. In step S1507, the wireless LAN communication control unit 305 determines to end the processing, assuming that the wireless LAN communication with the relay apparatus 20 has failed.

FIG. 16 is a diagram illustrating step S1203 of FIG. 12, and is a flowchart illustrating a procedure for operations performed when the relay apparatus 20 makes a wireless LAN connection according to the present embodiment.

In step S1601, the wireless LAN communication control unit 505 and the public wireless communication control unit 507 start wireless LAN tethering. In step S1602, the authorization relay service control unit 510 starts the authorization relay service. In step S1603, the wireless LAN communication control unit 505 determines whether or not a wireless LAN communication connection request has been received from the communication apparatus 10. In the case where the request has been received (S1603; YES), the process moves to step S1604. On the other hand, in the case where the request has not been received (S1603; NO), the process moves to step S1610.

In step S1604, the wireless LAN communication control unit 505 starts the wireless LAN communication connection with the communication apparatus 10. In step S1605, the wireless LAN communication control unit 505 determines whether or not the wireless LAN communication connection with the communication apparatus 10 has succeeded. In the case where the connection has succeeded (S1605; YES), the process moves to step S1606. On the other hand, in the case where the connection has failed (S1605; NO), the process moves to step S1610.

In step S1606, the communication apparatus cooperative control unit 509 determines whether or not a message providing a notification that the communication apparatus 10 is present on the wireless LAN has been received from the communication apparatus 10. In the case where the message has been received (S1606; YES), the process moves to step S1607, whereas in the case where the message has not been received (S1606; NO), the process moves to step S1610. In step S1607, the communication apparatus cooperative control unit 509 discovers the communication apparatus 10 on the wireless LAN.

In step S1608, the communication apparatus cooperative control unit 509 and the authorization relay service control unit 510 broadcast the presence of the relay apparatus 20 on the wireless LAN and the presence of the authorization relay service. In step S1609, the wireless LAN communication control unit 505 determines to end the processing, assuming that the wireless LAN communication with the communication apparatus 10 has succeeded. In step S1610, the wireless LAN communication control unit 505 determines to end the processing, assuming that the wireless LAN communication with the communication apparatus 10 has failed.

FIG. 17 is a diagram illustrating step S1108 of FIG. 11, and is a flowchart illustrating a procedure for operations through which the communication apparatus 10 carries out authorization according to the present embodiment.

In step S1701, the authorization control unit 309 generates the authorization relay request based on the authorization relay request information 2200 illustrated in FIG. 20C, and sends the authorization relay request to the authorization relay service provided by the relay apparatus 20. In the present embodiment, the authorization control unit 309 specifies "code", which is a value indicating the authorization code grant type, in response_type 2201 of the authorization relay request information 2200. Furthermore, the authorization control unit 309 specifies the device ID 2001 of the communication apparatus 10 in client_id 2202 of the authorization relay request information 2200. Further still, the authorization control unit 309 specifies the access authority range of the user 30 for the resource in the resource server 60, in scope 2203 of the authorization relay request information 2200. Furthermore, the authorization control unit 309 specifies a random value in state 2204 of the authorization relay request information 2200.

Figure 20D:
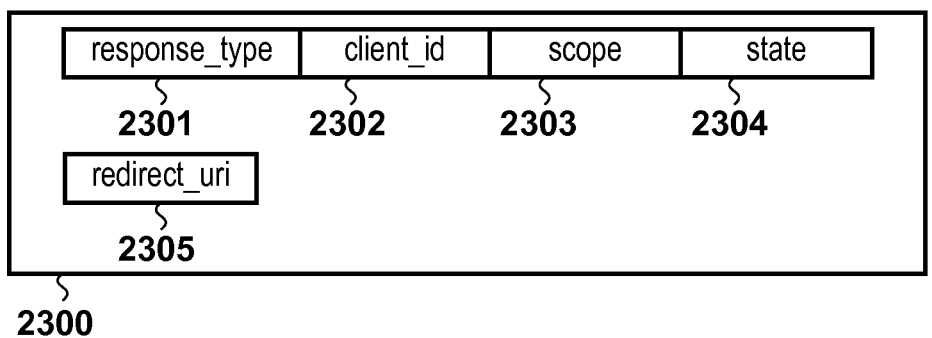
Figure 20E:
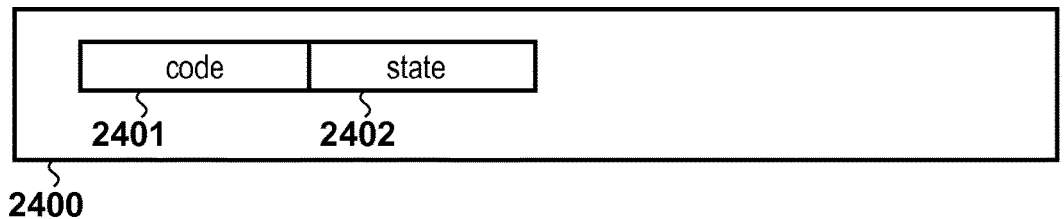
Figure 20F:
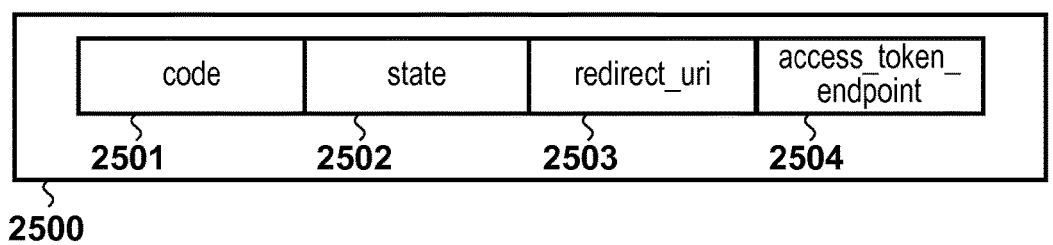

In step S1702, the authorization control unit 309 determines whether or not the authorization relay response based on authorization relay response information 2500 illustrated in FIG. 20F has been received from the relay apparatus 20. In the case where the response has been received (S1702; YES), the process moves to step S1703, whereas in the case where the response has not been received (S1702; NO), the process moves to step S1713.

In step S1703, the authorization control unit 309 analyzes the authorization relay response and attempts to obtain the authorization code indicated by code 2501, a redirect URI indicated by redirect_uri 2503, and the access token endpoint indicated by access_token_endpoint 2504.

In step S1704, the authorization control unit 309 determines whether or not the access token endpoint indicated by the access_token_endpoint 2504 in the authorization relay response has been obtained. In the case where the access token endpoint has been obtained (S1704; YES), the process moves to step S1705, whereas in the case where the access token endpoint has not been obtained (S1704; NO), the process moves to step S1713.

In step S1705, the authorization control unit 309 determines whether or not the authorization code indicated by the code 2501 in the authorization relay response has been obtained. In the case where the authorization code has been obtained (S1705; YES), the process moves to step S1706, whereas in the case where the authorization code has not been obtained (S1705; NO), the process moves to step S1713.

Figure 20G:
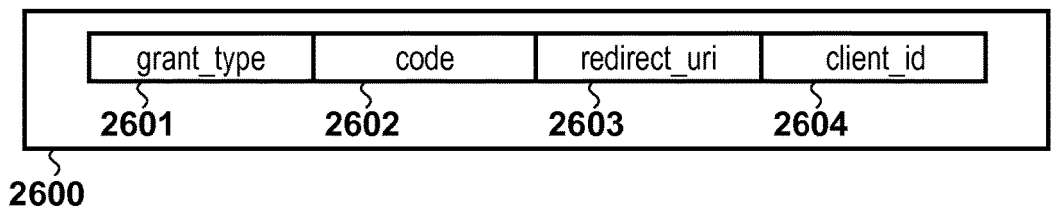

In step S1706, the authorization control unit 309 generates the access token request based on the access token request information 2600 illustrated in FIG. 20G. In the present embodiment, the authorization control unit 309 specifies "authorization_code", which is a value indicating the authorization code grant type, in grant_type 2601 of the access token request information 2600. Furthermore, the authorization control unit 309 specifies the authorization code obtained in step S1705 in code 2602 of the access token request information 2600. In other words, the authorization control unit 309 specifies the value of the code 2501 in the code 2602. Furthermore, the authorization control unit 309 specifies the value of the redirect_uri 2503 of the authorization relay response in redirect_uri 2603 of the access token request information 2600. Further still, the authorization control unit 309 specifies the same value as that of client_id 2202 of the authorization relay request in client_id 2604 of the access token request information 2600. Then, the authorization control unit 309 sends the access token request to the access token endpoint of the authorization server 50 obtained in step S1704.

Figure 20H:
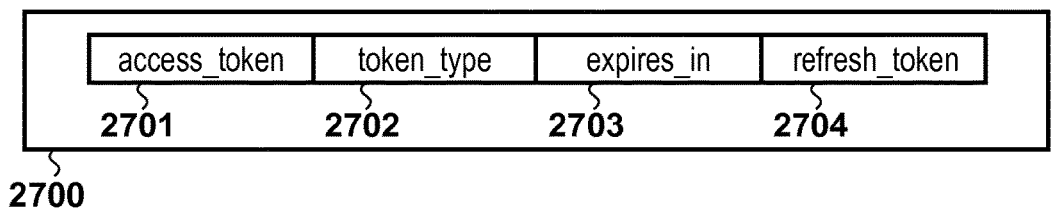

In step S1707, the authorization control unit 309 determines whether or not the access token response based on the access token response information 2700 illustrated in FIG. 20H has been received from the authorization server 50. In the case where the response has been received (S1707; YES), the process moves to step S1708, whereas in the case where the response has not been received (S1707; NO), the process moves to step S1713. In step S1708, the authorization control unit 309 analyzes the access token response and attempts to obtain an access token indicated by access_token 2701 and a refresh token indicated by refresh_token 2704.

In step S1709, the authorization control unit 309 determines whether or not the access token indicated by the access_token 2701 in the access token response has been obtained. In the case where the access token has been obtained (S1709; YES), the process moves to step S1710, whereas in the case where the access token has not been obtained (S1709; NO), the process moves to step S1713. In step S1710, the authorization control unit 309 stores the obtained access token and refresh token using the storage control unit 304.

In step S1711, the authorization control unit 309 notifies the authorization relay service of the relay apparatus 20 of a successful authorization as the authorization result. In step S1712, the authorization control unit 309 ends the processing assuming that the authorization has succeeded. In step S1713, the authorization control unit 309 notifies the authorization relay service of the relay apparatus 20 of a failed authorization as the authorization result. In step S1714, the authorization control unit 309 ends the processing assuming that the authorization has failed.

FIG. 18 is a diagram illustrating step S1206 of FIG. 12, and is a flowchart illustrating a procedure for operations through which the relay apparatus 20 carries out authorization according to the present embodiment.

In step S1801, the authorization relay service control unit 510 determines whether or not the authorization relay request based on the authorization relay request information illustrated in FIG. 20C has been received from the communication apparatus 10. In the case where the request has been received (S1801; YES), the process moves to step S1802, whereas in the case where the request has not been received (S1801; NO), the process moves to step S1819.

In step S1802, the authorization relay service control unit 510 generates the authorization request based on the authorization request information illustrated in FIG. 20D, using the authorization relay request received from the communication apparatus 10. In the present embodiment, the authorization relay service control unit 510 specifies the same values as those of 2201-2204 of the authorization relay request information received in step S1801, in 2301-2304 of the authorization request information. Furthermore, the authorization relay service control unit 510 specifies a URI (Unique Resource Identifier) indicating the authorization application unit 513 of the relay apparatus 20 in redirect_uri 2305.

In step S1803, the authorization control unit 512 sends the generated authorization request to the authorization server 50. In step S1804, the authorization control unit 512 determines whether or not the user authentication screen data written in HTML has been received from the authorization server 50. In the case where the data has been received (S1804; YES), the process moves to step S1805, whereas in the case where the data has not been received (S1804; NO), the process moves to step S1819.

In step S1805, the web browser control unit 508 displays the received user authentication screen in the display unit 405. In step S1806, the web browser control unit 508 receives the user authentication information (user ID, password) input by the user 30. In step S1807, the web browser control unit 508 sends the user authentication information (user ID, password) input by the user 30 to the authorization server 50, using the HTTP digest authentication method.

In step S1808, the web browser control unit 508 determines whether or not the user authentication has succeeded. In the case where the user authentication has succeeded (S1808; YES), the process moves to step S1809. On the other hand, in the case where the user authentication has failed (S1808; NO), the process moves to step S1819. In step S1809, the web browser control unit 508 determines whether or not the access authority granting screen data written in HTML has been received from the authorization server 50. In the case where the data has been received (S1809; YES), the process moves to step S1810, whereas in the case where the data has not been received (S1809; NO), the process moves to step S1819.

In step S1810, the web browser control unit 508 displays the received access authority granting screen in the display unit 405. In step S1811, the web browser control unit 508 receives access authority granting instruction information input by the user 30. Specifically, the web browser control unit 508 receives information corresponding to an authorize button or a deny button, pressed by the user 30, displayed in the access authority granting screen.

In step S1812, the web browser control unit 508 sends the access authority granting instruction information to the authorization server 50. In step S1813, the authorization control unit 512 determines whether or not the authorization response based on the authorization response information illustrated in FIG. 24 has been received from the authorization server 50 via the web browser control unit 508. In the case where the response has been received (S1813; YES), the process moves to step S1814, whereas in the case where the response has not been received (S1813; NO), the process moves to step S1819.

In step S1814, the authorization relay service control unit 510 generates the authorization relay response based on the authorization relay response information 2500 illustrated in FIG. 20F, using the authorization response received from the authorization server 50. In the present embodiment, the authorization relay service control unit 510 specifies the same values as those of 2401-2402 of the authorization response information received in step S1813, in 2501-2502 of the authorization relay response information. Furthermore, the authorization relay service control unit 510 specifies the same value as that of redirect_uri 2305 of the authorization request information 2300, in the redirect_uri 2503.

In step S1815, the authorization relay service control unit 510 sends the authorization relay response generated in step S1814 to the communication apparatus 10. In step S1816, the authorization relay service control unit 510 determines whether or not an authorization result has been received from the communication apparatus 10. In the case where the result has been received (S1816; YES), the process moves to step S1817, whereas in the case where the result has not been received (S1816; NO), the process moves to step S1819.

In step S1817, the authorization relay service control unit 510 determines whether or not the authorization result received from the communication apparatus 10 indicates that the authorization is successful. In the case where the authorization has succeeded (S1817; YES), the process moves to step S1818, whereas in the case where the authorization has failed (S1817; NO), the process moves to step S1819. In step S1818, the authorization control unit 512 ends the processing assuming that the authorization has succeeded. In step S1819, the authorization control unit 512 ends the processing assuming that the authorization has failed.

FIG. 19 is a diagram illustrating step S1111 of FIG. 11, and is a flowchart illustrating a procedure for operations through which the communication apparatus 10 obtains a resource according to the present embodiment.

In step S1901, the authorization determination unit 308 determines whether or not the access token is held. In the case where the token is held (S1901; YES), the process moves to step S1902, whereas in the case where the token is not held (S1901; NO), the process moves to step S1906. In step S1902, the resource obtainment unit 310 issues a request to obtain the specified resource to the resource server 60 via the relay apparatus 20. In step S1903, the resource obtainment unit 310 determines whether or not a resource obtainment response has been received from the resource server 60. In the case where the response has been received (S1903; YES), the process moves to step S1904, whereas in the case where the response has not been received (S1903; NO), the process moves to step S1906.

In step S1904, the resource obtainment unit 310 determines whether or not the resource has been successfully obtained from the resource server 60. In the case where the obtainment has succeeded (S1904; YES), the process moves to step S1905, whereas in the case where the obtainment has failed (S1904; NO), the process moves to step S1906. In step S1905, the resource obtainment unit 310 ends the processing assuming that the resource obtainment has succeeded. In step S1906, the resource obtainment unit 310 ends the processing assuming that the resource obtainment has failed.

FIG. 20C is a diagram illustrating an example of the data structure of the authorization relay request information according to the present embodiment. The authorization relay request information 2200 corresponds to the entirety of the parameter information necessary for the authorization relay request according to the present embodiment. The response_type 2201 is an authorization grant type according to OAuth 2.0. In the present embodiment, the response_type 2201 specifies "code", which is a value indicating the authorization code grant type. The client_id 2202 is the client type according to OAuth 2.0. In the present embodiment, the client_id 2202 specifies the device ID 2001 of the communication apparatus 10. The scope 2203 indicates the access authority range according to OAuth 2.0. The state 2204 is a random value for maintaining a state according to OAuth 2.0.

FIG. 20D is a diagram illustrating an example of the data structure of the authorization request information according to the present embodiment. Note that with respect to the authorization request information, descriptions of data items that are the same as in the authorization relay request information illustrated in FIG. 20C will be omitted, and only the differences will be mentioned. The authorization request information 2300 corresponds to the entirety of the parameter information necessary for the authorization request according to the present embodiment.

scope 2303 is the same as the scope 2203 illustrated in FIG. 20C. In the present embodiment, the authorization application unit 513 uses the same value for the scope 2303 as for the scope 2203. This means that the relay apparatus 20 issues, to the authorization server 50, a request for the same access authority range as requested by the communication apparatus 10. On the other hand, the authorization application unit 513 may use a different value for the scope 2303 from the value of the scope 2203. This means that the relay apparatus 20 issues, to the authorization server 50, a request for a different access authority range from the access authority range requested by the communication apparatus 10.

The redirect_uri 2305 is a redirect endpoint according to OAuth 2.0. In the present embodiment, the redirect_uri 2305 specifies a URI indicating the authorization application unit 513 of the relay apparatus 20. Through this, when the authorization response is received from the authorization server 50, the relay apparatus 20 can pass the data of the authorization response to the authorization application unit 513.

FIG. 20E is a diagram illustrating an example of the data structure of the authorization response information according to the present embodiment. Note that with respect to the authorization response information, descriptions of data items that are the same as those in the various types of information illustrated in FIGS. 20C-20D will be omitted, and only the differences will be mentioned.

The authorization response information 2400 corresponds to the entirety of the parameter information necessary for the authorization response according to the present embodiment. code 2401 is an authorization code according to OAuth 2.0.

FIG. 20F is a diagram illustrating an example of the data structure of the authorization relay response information according to the present embodiment. Note that with respect to the authorization relay response information, descriptions of data items that are the same as those in the various types of information illustrated in FIGS. 20C-20E will be omitted, and only the differences will be mentioned.

The authorization relay response information 2500 corresponds to the entirety of the parameter information necessary for the authorization relay response according to the present embodiment. The access_token_endpoint 2504 is an endpoint that receives the access token request in the authorization server 50, or in other words, is a URI.

FIG. 20G is a diagram illustrating an example of the data structure of the access token request information according to the present embodiment. Note that with respect to the access token request information, descriptions of data items that are the same as those in the various types of information illustrated in FIGS. 20C-20F will be omitted, and only the differences will be mentioned.

The access token request information 2600 corresponds to the entirety of the parameter information necessary for the access token request according to the present embodiment. The grant_type 2601 is an authorization grant type according to OAuth 2.0. In the present embodiment, the grant_type 2601 specifies "authorization_code", which is a value indicating the authorization code grant type.

FIG. 20H is a diagram illustrating an example of the data structure of the access token response information according to the present embodiment. Note that with respect to the access token response information, descriptions of data items that are the same as those in the various types of information illustrated in FIGS. 20C-20G will be omitted, and only the differences will be mentioned.

The access token response information 2700 corresponds to the entirety of the parameter information necessary for the access token response according to the present embodiment. The access_token 2701 is an access token according to OAuth 2.0. token_type 2702 is an access token type according to OAuth 2.0. expires_in 2703 is the expiration date of the access token according to OAuth 2.0. The refresh_token 2704 is the refresh token according to OAuth 2.0.

Figure 21:
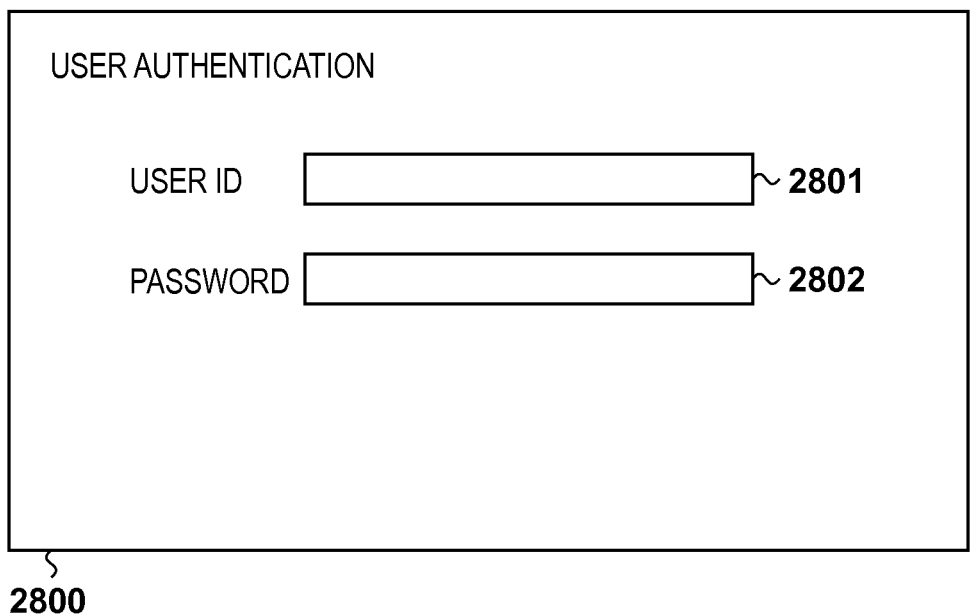
FIG. 21 is a diagram illustrating an example of a user authentication screen according to the first embodiment.

FIG. 21 is a diagram illustrating an example of the user authentication screen according to the present embodiment. A user authentication screen 2800 corresponds to the user authentication screen according to the present embodiment. The user authentication screen 2800 is written in HTML, and is displayed in the display unit 405 of the relay apparatus 20 by the web browser control unit 508. User ID 2801 indicates a text field into which the user ID is input. Password 2802 indicates a text field into which the user password is input.

Figure 22:
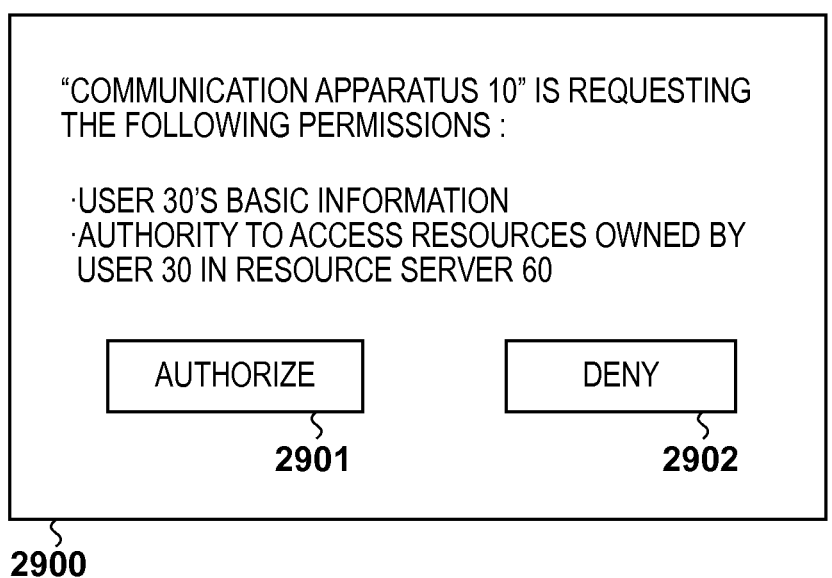
FIG. 22 is a diagram illustrating an example of an access authority granting screen according to the first embodiment.

FIG. 22 is a diagram illustrating an example of the access authority granting screen according to the present embodiment. An access authority granting screen 2900 corresponds to the access authority granting screen according to the present embodiment. The access authority granting screen 2900 is written in HTML, and is displayed in the display unit 405 of the relay apparatus 20 by the web browser control unit 508. An authorize button 2901 is a button indicating that access authority is to be granted to an authorization target (the communication apparatus 10, in the present embodiment). A deny button 2902 is a button indicating that access authority is not to be granted to an authorization target (the communication apparatus 10, in the present embodiment).

As described thus far, the communication apparatus 10 sends the authorization relay request to the relay apparatus 20. Then, the relay apparatus 20 sends the authorization request based on the authorization relay request to the authorization server 50. The relay apparatus 20 then receives the user authentication screen data and the access authority granting screen data written in HTML from the authorization server 50, and displays that data in the display unit 405 using the web browser control unit 508. The relay apparatus 20 sends an input from the user 30 to the authorization server 50, and receives the authorization response from the authorization server 50. Thereafter, the relay apparatus 20 sends the authorization relay response based on the authorization response to the communication apparatus 10. The communication apparatus 10 then sends the access token request to the authorization server 50 using the authorization relay response, and receives the access token response. Thus by using the relay apparatus 20, the user 30 can authorize the communication apparatus 10, which does not include a web browser, with the authorization server 50, which requires a web browser, thus increasing the convenience for the user.

Furthermore, the communication apparatus 10 establishes an NFC communication connection with the relay apparatus 20 and receives the relay apparatus information 2100. The communication apparatus 10 then establishes a wireless LAN communication connection with the relay apparatus 20, using the wireless parameters 2103 in the relay apparatus information 2100. Then, the communication apparatus 10 sends the authorization relay request to the relay apparatus 20 through wireless LAN communication. Accordingly, the user 30 can start the authorization with the communication apparatus 10 simply by touching the communication apparatus 10 to the relay apparatus 20 and starting the NFC communication, thus increasing the convenience for the user.

In addition to the foregoing, the communication apparatus 10 determines whether or not the relay apparatus 20 and the authorization relay service have been discovered after establishing the wireless LAN communication connection with the relay apparatus 20. In the case where the stated items have been discovered, the communication apparatus 10 sends the authorization relay request to the relay apparatus 20, whereas in the case where the stated items have not been discovered, the communication apparatus 10 does not send the authorization relay request. Accordingly, the communication apparatus 10 can determine whether or not it is possible to carry out the authorization process with the connected relay apparatus 20. The communication apparatus 10 can therefore avoid the wasteful sending of an authorization relay request in the case where the connected relay apparatus 20 does not have the authorization relay service and the authorization cannot be carried out. Through this, the processing response and processing efficiency of the communication apparatus 10 in such a case can be improved.

Furthermore, although the communication apparatus 10 does not include the web browser control unit in the present embodiment, the invention is not limited thereto. In other words, after the communication apparatus 10 has discovered the relay apparatus 20 and the authorization relay service, the authorization determination unit 308 of the communication apparatus 10 further determines whether or not the communication apparatus 10 includes a web browser control unit. In the case where the communication apparatus 10 does not include a web browser control unit, the authorization determination unit 308 determines to send the authorization relay request to the relay apparatus 20. On the other hand, in the case where the communication apparatus 10 includes a web browser control unit, the authorization relay request is not sent to the relay apparatus 20, and instead, the authorization request is sent directly to the authorization server 50 using the authorization control unit 309 of the communication apparatus 10. Through this, the user 30 can carry out the authorization process using whichever of the communication apparatus 10 and the relay apparatus 20 that is better suited to do so in accordance with whether or not the communication apparatus 10 includes a web browser control unit; this increases the convenience.

Furthermore, after receiving the authorization relay response from the relay apparatus 20, the communication apparatus 10 sends an authorization result indicating success or failure to the relay apparatus 20. The relay apparatus 20 receives the authorization result indicating success or failure from the communication apparatus 10. In the present embodiment, the user 30 primarily operates the relay apparatus 20 during the authorization process, and thus using the stated procedure makes it possible to display, for example, the result of the authorization process in the display unit 405 of the relay apparatus 20. This increases the convenience for the user.

Furthermore, the authorization relay service control unit 510 of the relay apparatus 20 specifies the same value as that of redirect_uri 2305 of the authorization request information 2300, in the redirect_uri 2503 of the authorization relay response. The authorization control unit 309 of the communication apparatus 10 then specifies the value of the redirect_uri 2503 of the authorization relay response, in the redirect_uri 2603 of the access token request information 2600.

With the authorization code grant type according to OAuth 2.0, it is necessary for the value of the redirect URI included in the authorization request to match the value of the redirect URI included in the access token request. Accordingly, as described above, in the present embodiment, the relay apparatus 20 includes the redirect URI specified by the authorization request in the authorization relay response, and sends the authorization relay response to the communication apparatus 10. Through this, the communication apparatus 10 can specify, in the access token request, the same value as the redirect URI in the authorization request sent by the relay apparatus 20 to the authorization server 50.

Second Embodiment

The present embodiment describes a case in which the user 30 operates the relay apparatus 20 and starts the authorization process from the relay apparatus 20. In the present embodiment, descriptions of items that are the same as those in the first embodiment will be omitted, and only the differences will be mentioned.

FIG. 23 is a sequence chart illustrating an example of messages exchanged during a wireless connection between the communication apparatus 10 and the relay apparatus 20 according to the present embodiment. Note that FIG. 23 corresponds to FIG. 7, which indicates the wireless connection sequence according to the first embodiment.

In M3001, the user 30 operates the relay apparatus 20 and instructs the authorization application to be executed. In M3002, the relay apparatus 20 executes the authorization application unit 513, and generates the relay apparatus information 2100 in which the information necessary for wireless LAN communication with the relay apparatus 20 is specified in the wireless parameters 2103. The authorization application unit 513 then uses the NFC communication control unit 506 to establish an NFC communication-capable state. The authorization application unit 513 uses the display control unit 502 to display a message, to the user 30, indicating that the communication apparatus 10 and the relay apparatus 20 should be touched in order to start the NFC communication.

In M3003, the user 30 touches the relay apparatus 20 to the communication apparatus 10. In M3004, the communication apparatus 10 and the relay apparatus 20 detect each other's NFC communication. In M3005, the relay apparatus 20 sends the relay apparatus information 2100 to the communication apparatus 10 using the NFC communication control unit 506. Meanwhile, the communication apparatus 10 receives the relay apparatus information 2100 from the relay apparatus 20 using the NFC communication control unit 306.

In M3006, the communication apparatus 10 refers to an application type 2102 in the relay apparatus information 2100 received through the NFC communication and executes the instructed authorization application unit 311. Then, the authorization application unit 311 generates the communication apparatus information 2000 specifying the authorization application in the application type 2002. In M3007, the communication apparatus 10 sends the communication apparatus information 2000 to the relay apparatus 20 using the NFC communication control unit 306. Meanwhile, the relay apparatus 20 receives the communication apparatus information 2000 from the communication apparatus 10 using the NFC communication control unit 506.

In M3008, the relay apparatus 20 starts wireless LAN tethering based on the wireless parameters 2103, using the wireless LAN communication control unit 505 and the public wireless communication control unit 507. In M3009, the relay apparatus 20 starts the authorization relay service using the authorization relay service control unit 510.

In M3010, the communication apparatus 10 displays, to the user 30, a message confirming whether it is okay to start authorization with the relay apparatus 20, using the authorization application unit 311 and the display control unit 302.

In M3011, the user 30 presses an OK button indicating that it is okay for the authorization to start. M3012-M3016 are the same as M710-M714 in FIG. 7.

FIG. 24 is a flowchart illustrating an overall procedure for operations performed by the communication apparatus 10 according to the present embodiment. Note that FIG. 24 corresponds to FIG. 11, which indicates the wireless connection sequence according to the first embodiment. Steps S3101-S3102 are the same as steps S1103-S1104 in FIG. 11.

In step S3103, the authorization application unit 311 displays, to the user 30, a message confirming whether it is okay to start authorization with the relay apparatus 20, using the display control unit 302. In step S3104, the authorization application unit 311 determines whether or not the user 30 has accepted the start of authorization with the relay apparatus 20. In the case where the user 30 has accepted the start (S3104; YES), the process moves to step S3105. On the other hand, in the case where the user 30 has not accepted the start (S3104; NO), the process moves to step S3114. Steps S3105-S3115 are the same as steps S1105-S1115 in FIG. 11.

As described thus far, after establishing an NFC communication connection with the relay apparatus 20 but before establishing a wireless LAN communication connection, the communication apparatus 10 confirms with the user 30 whether or not it is okay to start the authorization. Through this, it is possible to avoid a situation where the communication apparatus 10 carries out authorization, unintended by the user 30, with a different relay apparatus from the relay apparatus 20. For example, there are cases where a malicious third party uses a relay apparatus owned by that third party to attempt to carry out a malicious authorization with the communication apparatus 10 owned by the user 30. This increases the safety of the communication apparatus 10.

Other Embodiments

Embodiments of the present invention can also be realized by a computer of a system or apparatus that reads out and executes computer executable instructions (e. g., one or more programs) recorded on a storage medium (which may also be referred to more fully as a 'non-transitory computer-readable storage medium') to perform the functions of one or more of the above-described embodiments and/or that includes one or more circuits (e. g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e. g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-059079, filed Mar. 20, 2014 which is hereby incorporated by reference herein in its entirety.

What is claimed is:

1. A relay apparatus capable of relaying communication between a communication apparatus and an authorization server, the relay apparatus comprising:
   a display unit;
   at least one processor; and
   at least one memory storing code to be executed by the at least one processor, wherein
   the at least one processor executes the code to function as:
   a first display control unit configured to cause the display unit to display a user authentication screen requiring a user to input user authentication information to be used for user authentication in a case where the relay apparatus receives an authorization request sent from the communication apparatus through first wireless communication;
   a first sending unit configured to send, to the authorization server, user authentication information which is inputted by the user on the user authentication screen,
   a second display control unit configured to cause the display unit to display an access authority granting screen requiring the user to input whether or not to authorize the communication apparatus in a case where a user authentication process succeeds at the authorization server based on the user authentication information sent by the first sending unit;
   a receiving unit configured to receive an authorization response sent from the authorization server in a case where authorizing the communication apparatus is inputted by the user on the access authority granting screen; and
   a second sending unit configured to send, to the communication apparatus, the authorization response received by the receiving unit through the first wireless communication.

2. The relay apparatus according to claim 1,
   wherein the display unit displays the user authentication screen written in a predetermined format received from the authorization server.

3. The relay apparatus according to claim 2,
   wherein the display unit displays the access authority granting screen written in the predetermined format received from the authorization server.

4. The relay apparatus according to claim 3,
   wherein the predetermined format is HTML.

5. The relay apparatus according to claim 1,
   wherein the user authentication information is a user ID or a password.

6. The relay apparatus according to claim 1, further comprising a relaying unit configured to send, to the authorization server, the authorization request which is sent from the communication apparatus.

7. The relay apparatus according to claim 1, further comprising a communication unit configured to communicate with the communication apparatus through a second wireless communication whose transfer speed is slower than the first wireless communication.

8. The relay apparatus according to claim 7,
   wherein before communicating through the first wireless communication, the communication unit uses the second wireless communication to set parameters required by the first wireless communication with the communication apparatus.

9. The relay apparatus according to claim 8,
   wherein the first wireless communication is a wireless LAN and the second wireless communication is an NFC (Near Field Communication) or Bluetooth.

10. The relay apparatus according to claim 1,
wherein the user authentication process complies with an OAuth protocol.

11. The relay apparatus according to claim 1,
wherein the display unit displays the user authentication screen by using a web browser.

12. A control method for a relay apparatus capable of relaying communication between a communication apparatus and an authorization server, the method comprising:
displaying on a display unit of the relay apparatus a user authentication screen requiring a user to input user authentication information to be used for user authentication in a case where the relay apparatus receives an authorization request sent from the communication apparatus through first wireless communication;
sending, to the authorization server, user authentication information which is inputted by the user on the user authentication screen;
displaying on the display unit of the relay apparatus an access authority granting screen requiring the user to input whether or not to authorize the communication apparatus in a case where a user authentication process succeeds at the authorization server based on the user authentication information;
receiving an authorization response sent from the authorization server in a case where authorizing the communication apparatus is inputted by the user on the access authority granting screen; and
sending, to the communication apparatus, the authorization response through the first wireless communication.

13. A system comprising a communication apparatus and a relay apparatus,
wherein the relay apparatus includes:
a display unit;
at least one processor; and
at least one memory storing code to be executed by the at least one processor, wherein
the at least one processor executes the code to function as:
a first display control unit configured to cause the display unit to display a user authentication screen requiring a user to input user authentication information to be used for user authentication in a case where the relay apparatus receives an authorization request sent from the communication apparatus through first wireless communication;
a first sending unit configured to send, to the authorization server, user authentication information which is inputted by the user on the user authentication screen,
a second display control unit configured to cause the display unit to display an access authority granting screen requiring the user to input whether or not to authorize the communication apparatus in a case where a user authentication process succeeds at the authorization server based on the user authentication information sent by the first sending unit;
a receiving unit configured to receive an authorization response sent from the authorization server in a case where authorizing the communication apparatus is inputted by the user on the access authority granting screen; and
a second sending unit configured to send, to the communication apparatus, the authorization response received by the receiving unit through the first wireless communication; and
wherein the communication apparatus includes:
a communication unit configured to communicate with the relay apparatus through the first wireless communication; and
a determination unit configured to determine whether or not to grant access to a server via the relay apparatus through the first wireless communication based on the authorization response received by the communication unit.

14. A non-transitory computer-readable storage medium storing a computer program for causing a computer to execute a method of a relay apparatus capable of relaying communication between a communication apparatus and an authorization server, the method comprising:
displaying on a display unit of the relay apparatus a user authentication screen requiring a user to input user authentication information to be used for user authentication in a case where the relay apparatus receives an authorization request which is sent from the communication apparatus and the server through first wireless communication;
sending, to the authorization server, user authentication information which is inputted by the user on the user authentication screen;
displaying on the display unit of the relay apparatus an access authority granting screen requiring the user to input whether or not to authorize the communication apparatus in a case where a user authentication process succeeds at the authorization server based on the user authentication information;
receiving an authorization response which is sent from the authorization server in a case where authorizing the communication apparatus is selected by the user in the access authority granting screen; and
sending, to the communication apparatus, the authorization response through the first wireless communication.

* * * * *